United States Patent
Wadensweiler et al.

(10) Patent No.: US 6,841,057 B2
(45) Date of Patent: Jan. 11, 2005

(54) METHOD AND APPARATUS FOR SUBSTRATE POLISHING

(75) Inventors: Ralph Wadensweiler, Sunnyvale, CA (US); Alain Duboust, Sunnyvale, CA (US); Liang-Yuh Chen, Foster City, CA (US); Manoocher Birang, Los Gatos, CA (US); Ratson Morad, Palo Alto, CA (US); Paul D. Butterfield, San Jose, CA (US)

(73) Assignee: Applied Materials Inc., Santa Clara, CA (US)

( * ) Notice: Subject to any disclaimer, the term of this patent is extended or adjusted under 35 U.S.C. 154(b) by 276 days.

(21) Appl. No.: 10/098,796

(22) Filed: Mar. 13, 2002

(65) Prior Publication Data

US 2003/0173230 A1 Sep. 18, 2003

(51) Int. Cl.[7] .................. C25F 3/00; C25D 17/00; C25C 7/04
(52) U.S. Cl. ............. 205/672; 204/224 M; 204/282
(58) Field of Search ................ 204/224 M, 282; 205/672

(56) References Cited

U.S. PATENT DOCUMENTS

| | | | |
|---|---|---|---|
| 4,597,836 A | 7/1986 | Schaer et al. ............. 204/4 |
| 4,696,729 A | 9/1987 | Santini .................. 204/224 R |
| 5,096,550 A | * 3/1992 | Mayer et al. ............. 205/642 |
| 5,232,875 A | 8/1993 | Tuttle et al. ............. 437/225 |
| 5,308,989 A | 5/1994 | Brubaker ............. 250/441.11 |
| 5,377,708 A | 1/1995 | Bergman et al. ............. 134/105 |
| 5,738,574 A | 4/1998 | Tolles et al. ............. 451/288 |
| 5,879,220 A | 3/1999 | Hasegawa et al. ............. 451/288 |
| 5,932,486 A | 8/1999 | Cook et al. ............. 438/692 |
| 6,010,317 A | 1/2000 | Maget et al. ............. 417/379 |
| 6,030,899 A | 2/2000 | Cook et al. ............. 438/692 |
| 6,040,011 A | 3/2000 | Yudovsky et al. ......... 427/255.28 |
| 6,080,050 A | 6/2000 | Chen et al. ............. 451/288 |
| 6,156,124 A | 12/2000 | Tobin ............. 118/719 |
| 6,156,167 A | 12/2000 | Patton et al. ............. 204/270 |
| 6,159,079 A | 12/2000 | Zuniga et al. ............. 451/41 |
| 6,203,622 B1 | 3/2001 | Halpin et al. ............. 118/730 |
| 6,210,255 B1 | 4/2001 | Zuniga et al. ............. 451/41 |
| 6,244,935 B1 | 6/2001 | Birang et al. ............. 451/41 |
| 6,277,014 B1 | 8/2001 | Chen et al. ............. 451/398 |
| 6,309,520 B1 | 10/2001 | Woodruff et al. ............. 204/242 |
| 6,368,190 B1 | * 4/2002 | Easter et al. ............. 451/41 |
| 6,413,388 B1 | * 7/2002 | Uzoh et al. ............. 204/224 R |
| 6,464,855 B1 | * 10/2002 | Chadda et al. ............. 205/662 |
| 6,572,755 B2 | * 6/2003 | Emesh et al. ............. 205/137 |

* cited by examiner

*Primary Examiner*—Patrick Ryan
*Assistant Examiner*—Thomas H. Parsons
(74) *Attorney, Agent, or Firm*—Thomson, Moser & Patterson

(57) ABSTRACT

A method and apparatus are provided for polishing a substrate surface. In one aspect, an apparatus for polishing a substrate includes a conductive polishing pad and an electrode having a membrane disposed therebetween. The membrane is orientated relative the conductive pad in a manner that facilitates removal of entrained gas from electrolyte flowing towards the conductive pad. The apparatus may be part of an electro-chemical polishing station that may optionally be part of a system that includes chemical mechanical polishing stations.

38 Claims, 11 Drawing Sheets

METHOD AND APPARATUS FOR SUBSTRATE POLISHING

BACKGROUND OF THE INVENTION

1. Field of the Invention

Embodiments of the present invention relate to a method and apparatus for planarizing a substrate surface.

2. Background of the Related Art

In the fabrication of integrated circuits and other electronic devices, multiple layers of conducting, semiconducting, and dielectric materials are deposited on or removed from a surface of a substrate. Thin layers of conducting, semiconducting, and dielectric materials may be deposited by a number of deposition techniques. Common deposition techniques in modern processing include physical vapor deposition (PVD), also known as sputtering, chemical vapor deposition (CVD), plasma-enhanced chemical vapor deposition (PECVD), and electrochemical plating (ECP).

As layers of materials are sequentially deposited and removed, the uppermost surface of the substrate may become non-planar across its surface and require planarization. Planarizing a surface, or "polishing" a surface, is a process where material is removed from the surface of the substrate to form a generally even, planar surface. Planarization is useful in removing undesired surface topography and surface defects, such as agglomerated materials, crystal lattice damage, scratches, and contaminated layers or materials. Planarization is also useful in forming features on a substrate by removing excess deposited material used to fill the features and to provide an even surface for subsequent levels of metallization and processing.

Chemical mechanical planarization, or chemical mechanical polishing (CMP), is a common technique used to planarize substrates. CMP utilizes a chemical composition, typically a slurry or other fluid medium, for selective removal of material from substrates. In conventional CMP techniques, a substrate carrier or polishing head is mounted on a carrier assembly and positioned in contact with a polishing pad in a CMP apparatus. The carrier assembly provides a controllable pressure to the substrate urging the substrate against the polishing pad. The pad is moved relative to the substrate by an external driving force. The CMP apparatus effects polishing or rubbing movement between the surface of the substrate and the polishing pad while dispersing a polishing composition to effect chemical activity and/or mechanical activity and consequential removal of material from the surface of the substrate.

One material increasingly utilized in integrated circuit fabrication is copper due to its desirable electrical properties. However, copper has its own special fabrication problems. For example, copper is difficult to pattern and etch, and new processes and techniques, such as damascene or dual damascene processes, are being used to form copper substrate features. In damascene processes, a feature is defined in a dielectric material and subsequently filled with copper. Dielectric materials with low dielectric constants, i.e., less than about 3, are being used in the manufacture of copper damascenes. Barrier layer materials are deposited conformally on the surfaces of the features formed in the dielectric layer prior to deposition of copper material. Copper material is then deposited over the barrier layer and the surrounding field. However, copper fill of the features usually results in excess copper material, or overburden, on the substrate surface that must be removed to form a copper filled feature in the dielectric material and prepare the substrate surface for subsequent processing.

One challenge that is presented in polishing copper materials is that the conductive material and the barrier materials are often removed from the substrate surface at different rates, both of which can result in excess conductive material being retained as residues on the substrate surface. Additionally, the substrate surface may have different surface topography, depending on the density or size of features formed therein. Copper material is removed at different removal rates along the different surface topography of the substrate surface, which makes effective removal of copper material from the substrate surface and final planarity of the substrate surface difficult to achieve.

One solution for polishing copper in low dielectric materials with reduced or minimal defects formed thereon is by polishing copper by electrochemical mechanical polishing (ECMP) techniques. ECMP techniques remove conductive material from a substrate surface by electrochemical dissolution while concurrently polishing the substrate with reduced mechanical abrasion compared to conventional CMP processes. The electrochemical dissolution is performed by applying an electrical bias between a cathode and substrate surface to remove conductive materials from a substrate surface into a surrounding electrolyte. During electrochemical dissolution, the substrate typically is placed in motion relative to a polishing pad to enhance the removal of material from the surface of the substrate. In one embodiment of an ECMP system, the electrical bias is applied by a ring of conductive contacts in electrical communication with the substrate surface in a substrate support device, such as a substrate carrier head. However, during ECMP processes, hydrogen bubbles formed at the cathode electrodes may come in contact with a surface of the substrate being polished. Hydrogen and other bubbles contacting the substrate electrically insulate that region of the substrate from current carried by the electrolyte, thereby locally disrupting the polishing process. As the hydrogen bubbles are not easily controlled and are often swept across the substrate's surface, the uniformity of the polishing process is difficult to control and results in poor polishing performance.

As a result, there is a need for an improved polishing apparatus.

SUMMARY OF THE INVENTION

Aspects of the invention generally provide a method and apparatus for polishing a layer on a substrate using electrochemical deposition techniques, electrochemical dissolution techniques, polishing techniques, and/or combinations thereof. In one aspect, an apparatus is provided for polishing a substrate that includes a conductive polishing pad and an electrode having a spacer disposed therebetween. The spacer has a first surface facing the electrode that extends from a center of the spacer to an edge of the spacer. A portion of the first surface proximate the spacer's edge is closer to the conductive pad than a portion of the first surface proximate the spacer's center.

In another aspect, an apparatus for polishing a substrate includes a conductive polishing pad and an electrode having a permeable membrane disposed therebetween. The conductive polishing pad has a substantially planar polishing surface. The membrane has a non-parallel orientation relative to the polishing surface of the conductive pad.

In another aspect, an apparatus for polishing a substrate includes a basin having sides and a bottom adapted to contain electrolyte during a polishing process and a plenum cap defining a plenum therebetween. The plenum cap is disposed on the bottom of the basin and has a plurality of apertures therethrough that are coupled to the plenum. A port formed through the bottom of the basin is coupled to the plenum.

In another aspect, an apparatus for polishing a substrate includes a conductive polishing pad and at least one polishing head adapted to place a substrate retained in the polishing head in contact with the conductive polishing pad. The conductive polishing pad is disposed in a tray and an electrode is disposed between the conductive polishing pad and a bottom of the tray. A membrane is disposed between the conductive polishing pad and the electrode. The membrane has an outer edge that is disposed closer to the conductive pad than a center portion of the membrane.

In another aspect, an apparatus for polishing a substrate includes a chemical mechanical polishing station, an electrochemical polishing station and a transfer device having at least one polishing head adapted to selectively place a substrate retained in the polishing head in contact with the chemical mechanical polishing station or the electrochemical polishing station. The electro-chemical polishing station may be coupled to an electrolyte delivery system. The electrolyte delivery system includes a plurality of baffles disposed therein and at least one pump adapted to flow electrolyte between the tank and the electro-chemical polishing station.

In another aspect of the invention, a method for electrochemical polishing a substrate is provided. In one embodiment, the method includes moving a substrate relative to a conductive polishing pad, flowing electrolyte between an electrode and the substrate, the electrolyte providing a conductive path between the electrode and the substrate through the conductive polishing pad, and flowing electrolyte through a membrane disposed between the electrode and the conductive pad, the membrane having an edge and a center portion, the edge disposed closer to the conductive pad than the center portion.

BRIEF DESCRIPTION OF THE DRAWINGS

A more particular description of the invention, briefly summarized above, may be had by reference to the embodiments thereof that are illustrated in the appended drawings. It is to be noted, however, that the appended drawings illustrate only typical embodiments of this invention and, therefore, are not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE PREFERRED EMBODIMENT

The words and phrases used herein should be given their ordinary and customary meaning in the art by one skilled in the art unless otherwise further defined herein. Chemical-mechanical polishing should be broadly construed and includes, but is not limited to, abrading a substrate surface by chemical activity, mechanical activity, or a combination of both chemical and mechanical activity. Electropolishing should be broadly construed and includes, but is not limited to, planarizing a substrate by the application of electrochemical activity. Electrochemical mechanical polishing (ECMP) should be broadly construed and includes, but is not limited to, planarizing a substrate by the application of electrochemical activity, or a combination of both electrochemical and mechanical activity to remove material from a substrate surface. Electrochemical mechanical plating process (ECMPP) should be broadly construed and includes, but is not limited to, electrochemically depositing material on a substrate and concurrently planarizing the deposited material by the application of electrochemical activity, or a combination of both electrochemical and mechanical activity.

Anodic dissolution should be broadly construed and includes, but is not limited to, the application of an anodic bias to a substrate directly or indirectly which results in the removal of conductive material from a substrate surface and into a surrounding electrolyte solution. Aperture should be broadly construed and includes, but is not limited to, a perforation, hole, opening, channel, or passage formed partially or completely through an object. Additionally, the term substantially as used to modifying the term planar is intended to describe a surface on a macroscopic or global level and not surface roughness.

Figure 1:
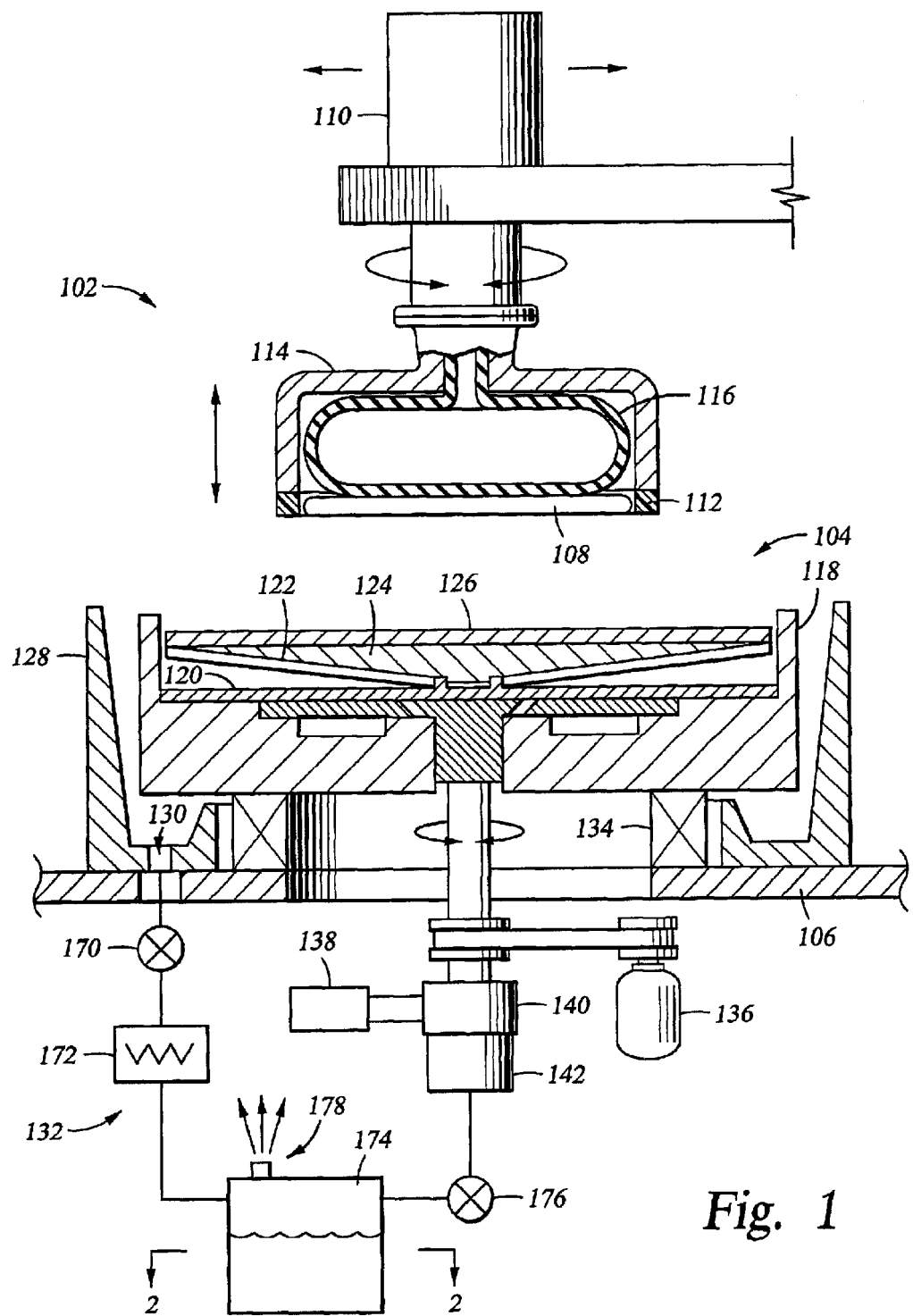
FIG. 1 is a sectional view of one embodiment of a processing cell of the invention.

FIG. 1 depicts a sectional view of one embodiment of a process cell 100 in which at least one process comprising anodic dissolution, plating and polishing processes may be practiced. The process cell 100 generally includes a basin assembly 104 and a polishing head 102. A substrate 108 is retained in the polishing head 102 and disposed in the basin assembly 104 during processing in a face-up (e.g., backside down) orientation. An electrolyte is flowed over the substrate's surface while the polishing head 102 is placed in contact with the substrate 108. The substrate 108 and a polishing surface disposed in the basin assembly 104 are moved relative to each other to provide a polishing motion. The polishing motion generally comprises at least one motion defined by an orbital, rotary, linear or curvilinear motion, or combinations thereof, among other motions. The polishing motion may be achieved by moving either or both of the polishing heads 102 and the basin assembly 104. The polishing head 102 may be stationary or driven to provide at least a portion of the relative motion between the basin assembly 104 and the substrate 108 held by the polishing head 102. In the embodiment depicted in FIG. 1, the polishing head 102 is coupled to a drive system 110. The drive system 110 moves the polishing head 102 with at least a rotary, orbital, sweep motion or combinations thereof.

The polishing head 102 generally retains the substrate 108 during processing. In one embodiment, the polishing head 102 includes a housing 114 enclosing a bladder 116. The bladder 116 may be deflated when contacting the substrate to create a vacuum therebetween, thus securing the substrate to the polishing head 102. The bladder 116 may additionally be inflated to press the substrate in contact with the polishing surface of the basin assembly 104. A retaining ring 112 is coupled to the housing 114 and circumscribes the substrate 108 to prevent the substrate from slipping out from the polishing head 102 while processing. One polishing head that may be adapted to benefit from the invention is a TITAN HEAD™ carrier head available from Applied Materials, Inc., located in Santa Clara, Calif. Another example of a polishing head that may be adapted to benefit from the invention is described in U.S. Pat. No. 6,159,079, issued Dec. 12, 2001, which is hereby incorporated herein by reference in its entirety.

The basin assembly 104 generally includes a tray 118 that houses an electrode 120, a membrane 122, a spacer 124 and a conductive pad 126. The electrode 120 is generally disposed at the bottom of the tray 118. The spacer 124 is disposed above the electrode 120 and supports the conductive pad 126. The membrane 122 is disposed between the electrode 120 and the spacer 124. The electrode 120, the membrane 122, the spacer 124 and the conductive pad 126 are generally fastened or clamped to the tray 118. In one embodiment, at least the membrane 122, the spacer 124 and the conductive pad 126 are fastened together using adhesives.

The basin assembly 104 is rotationally supported above a base 106 by bearings 134. A drive system 136 is coupled to the basin assembly 104 and rotates the basin assembly 104 during processing. A catch basin 128 is disposed on the base 106 and circumscribes the basin assembly 104 and collects processing fluids, such as an electrolyte, that flow out of the basin assembly 104 during processing.

An electrolyte delivery system 132 is generally coupled to the basin assembly 104. The electrolyte delivery system 132 flows electrolyte or other processing fluid into the basin assembly 104. During processing, the electrolyte generally provides an electrical path between the electrode 120 and substrate 108 through the conductive pad 126.

The electrolyte used in processing the substrate 108 can polish metals such as copper, aluminum, tungsten, gold, silver or other materials that can be electro-chemically deposited onto or electrochemically removed from the substrate 108. Electrolyte solutions may include commercially available electrolytes. For example, in copper containing material removal, the electrolyte may include sulfuric acid based electrolytes or phosphoric acid based electrolytes and potassium phosphate ($K_3PO_4$), or combinations thereof. The electrolyte may also contain derivatives of sulfuric acid based electrolytes, such as copper sulfate, and derivatives of phosphoric acid based electrolytes, such as copper phosphate. Electrolytes having perchloric acid-acetic acid solutions and derivatives thereof may also be used. Additionally, the invention contemplates using electrolyte compositions conventionally used in electroplating or electropolishing processes, including conventionally used electroplating or electropolishing additives, such as brighteners among others. In one aspect of the electrolyte solution, the electrolyte may be made of components (such as copper sulfate, for instance) having a concentration between about 0.2 and about 1.2 Molar of the solution.

As one example, copper sulfate ($CuSO_4$) can be used as the electrolyte. One source for electrolyte solutions used for electrochemical processes such as copper plating, copper anodic dissolution, or combinations thereof is Shipley Leonel, a division of Rohm and Haas, headquartered in Philadelphia, Pa., sold under the tradename ULTRAFILL 2000.

In one embodiment, the electrolyte is recirculated through the basin assembly 104. Electrolyte drains from the catch basin 128 through an outlet 130 to a first pump 170. The first pump 170 is typically a diaphragm pump to minimize the effects of particulates or entrained gases within the electrolyte on pumping. Other types of pumps may alternatively be used.

The first pump 170 pumps the electrolyte through a filter 172 and into a settling tank 174. The filter 172 removes particulates, bubbles and other processing by-products from the electrolyte drained from the basin assembly 104. The filter 172 typically has a pore size in the range of about 15 to about 0.1 micron. In one embodiment, the filter 172 has a 0.1 micron pore size, such as those available from Pall Company, located in East Hills, N.Y.

Figure 2:
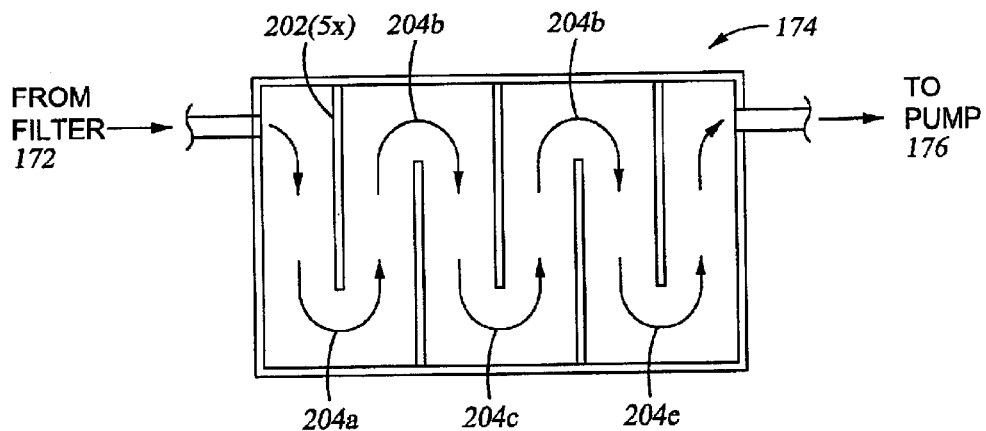
FIG. 2 is a sectional view of one embodiment of a settling tank taken along section lines 2—2 of FIG. 1.

FIG. 2 depicts a sectional view of one embodiment of the settling tank 174 taken along section lines 2—2 of FIG. 1. The settling tank includes a plurality of vertical baffles 202 disposed within the tank 174. The baffles 202 create an extended flowpath, as shown by flow arrows 204a–e, for the electrolyte pumped through the settling tank 174. The extended path through the settling tank 174 increases the dwell time of electrolyte passing through the tank 174, thereby allowing more entrained bubbles and debris to separate from the electrolyte flow as it passes around the baffles 202. Gases, such as hydrogen, separated from the electrolyte generally are exhausted from the settling tank 174 through a vent 178 (depicted in FIG. 1). Optionally, the volume above the electrolyte within the settling tank 174 may have a reduced, sub-atmospheric or vacuum pressure to enhance the removal of bubbles from the electrolyte within the settling tank 174.

Returning to FIG. 1, a second pump 176 pumps electrolyte from the settling tank 174 through a rotary union 142 and into the basin assembly 104. In one embodiment, the second pump 176 is a magnetic drive centrifugal pump, although other types of pumps may alternatively be utilized. The path of the electrolyte through the basin assembly 104 is described below in the detailed description of the components of the basin assembly 104.

A power source 138 is coupled between the electrode 120 and the conductive pad 126. A slip ring 140 is provided at the center of the tray 118 to facilitate continuous electrical connection between the electrode 120 and the conductive pad 126 as the basin assembly 104 rotates.

While the following conductive pad 126 is described for an electrochemical-mechanical polishing (ECMP) process, the invention contemplates using the conductive polishing media (pads) in other fabrication processes involving electrochemical activity. Examples of such processes using electrochemical activity include electrochemical deposition, which involves a conductive pad 126 being used to apply a uniform bias to a substrate surface for depositing a conductive material without the use of a conventional bias application apparatus, such as edge contacts, and electrochemical mechanical plating processes (ECMPP) that include a combination of electrochemical deposition and chemical mechanical polishing.

The conductive pad 126 can be a pad, a web or a belt of material, which is compatible with the fluid environment and the processing specifications. In the embodiment depicted in FIG. 1, the conductive pad 126 is circular in form and is adhered or otherwise retained in the tray 118 on top of the electrode 120 opposite the polishing head 102. The conductive pad 126 includes one or more conductive elements (not shown in FIG. 1) for contacting the surface of the substrate 108 during processing. An optional backing material (not shown) may be disposed between the electrode 120 and the conductive pad 126 to tailor the compliance and/or durometer of the conductive pad 126 during processing. Examples of a conductive pad that may be adapted to benefit from the invention are disclosed in U.S. Provisional Patent Application No. 60/286,107, filed Apr. 24, 2001 and No. 60/326,263, filed Oct. 1, 2001; U.S. Patent Provisional Application Serial No. 60/286,107, filed Apr. 24, 2001; and U.S. patent application Ser. No. 10/033,732, filed Dec. 27, 2001, all of which are incorporated herein by reference in their entireties.

Figure 3A:
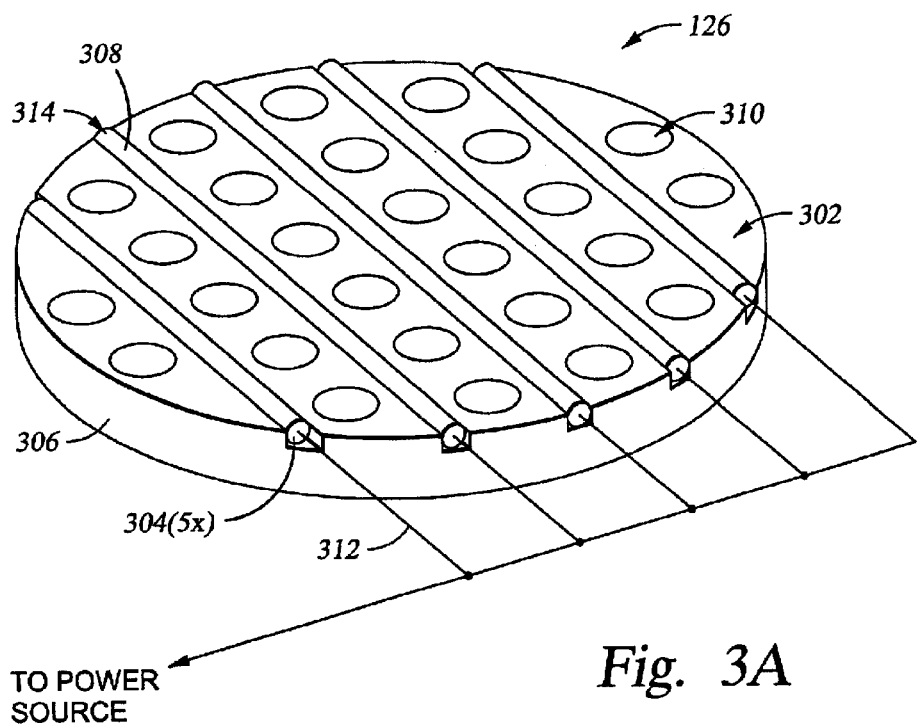
FIGS. 3A–F are various embodiments of conductive pads.

FIG. 3A depicts one embodiment of the conductive pad 126. The conductive pad 126 generally comprises a body 306 having a polishing surface 302 adapted to contact the substrate while processing. The polishing surface 302 has one or more pockets 304 formed therein to at least partially receive a respective conductive element 314. The conductive elements 314 generally have a contact surface 308 that extends above a plane defined by the polishing surface 302. The contact surface 308 is typically compliant to maximize electrical contact with the substrate. During polishing, the substrate generally provides a bias force that urges the contact surface 308 into a position co-planar with the polishing surface 302.

The body 306 is generally permeable to the electrolyte by a plurality of channels or apertures 310 formed therein. The plurality of apertures 310 allows electrolyte to flow through the body 306 and contact the surface of the substrate during processing. Apertures 310 formed in the conductive pad 126 may include perforations, channels, or holes in the body 306 having a diameter between about 0.5 millimeters (mm) and about 10 mm. While not shown in FIG. 3A, in one embodiment, the apertures 310 may have a diameter about equal to the thickness of the conductive pad 126, or an aspect ratio of about 1:5 between the thickness of the conductive pad 126 and the diameter of the apertures disposed therein.

The conductive pad 126 may have an aperture density between about 30 percent and about 80 percent of the surface area of the conductive pad 126 to provide for sufficient mass flow of electrolyte across the polishing surface 302. In one embodiment, an aperture density of about 50 percent provides sufficient electrolyte flow to facilitate uniform anodic dissolution from the substrate surface. Aperture density is broadly described herein as the area or volume of conductive pad 126 that the apertures 310 comprise of the surface or body of the conductive pad 126, i.e., the aggregate number and diameter or size of the apertures 310, when apertures are formed in the conductive pad 126.

The aperture size and density is selected to provide uniform distribution of electrolyte, as well as current distribution, through the conductive pad 126 to a substrate surface. Generally, the aperture size, aperture density, and organization of the apertures of the conductive pad 126 are configured and aligned relative to each other to provide for sufficient mass flow of electrolyte through the body 306 to the substrate surface.

The body 306 of the conductive pad 126 is generally made of a dielectric material. Examples of materials suitable for use in the body 306 include conventional polishing materials typically comprised of polymeric materials, such as polyurethane, polycarbonate, fluoropolymers, TEFLON®, polyphenylene sulfide (PPS), or combinations thereof, and other polishing materials used in polishing substrate surfaces. Body materials may also contain fillers and/or be foamed. Exemplary conventional material includes those made from polyurethane and/or polyurethane mixed with fillers, which are commercially available from Freudenberg with their FX9 pad. Other conventional polishing materials, such as a layer of compressible material, may also be utilized for the body 306. Compressible materials include, but are not limited to, soft materials such as compressed felt fibers leached with urethane or foam.

The pockets 304 generally are configured to retain the conductive elements 314 while processing, and accordingly may vary in shape and orientation. In the embodiment depicted in FIG. 3A, the pockets 304 are grooves of rectangular cross section and are disposed across the polishing surface 302 coupling two points on the perimeter of the conductive pad 126. Alternatively, the pockets 304 (and conductive elements 314 disposed therein) may be disposed at irregular intervals, be orientated radially, perpendicular and may additionally be linear, curved, concentric, involute curves or other orientation.

The conductive elements 314 generally have a bulk resistivity or a bulk surface resistivity of about 10 W-cm or less. In one embodiment, the conductive elements 314 have resistivity of about 1 W-cm or less.

Typically, the conductive elements 314 may include conductive polymers, polymer composites with conductive materials, conductive metals, conductive fillers or conductive doping materials, or combinations thereof. Conductive polymers include polymeric materials that are intrinsically conductive, such as polyacetylene, polyethylenedioxythiophene (PEDT), which is commercially available under the trade name BAYTRON™, polyaniline, polypyrrole, and combinations thereof. Another example of a conductive polymer is silicon filled with nickel-coated carbon. Additionally, the conductive elements 314 may include pure carbon fibers or coated carbon fibers, powder, flakes or be coated with any metal including noble metals.

Conductive elements 314 comprised of polymer composites with conductive materials may include polymer-noble metal hybrid materials. Polymer-noble metal hybrid materials that may be used as conductive elements 314 described herein are generally chemically inert with a surrounding electrolyte, such as those with noble metals that are resistant to oxidation and corrosion. An example of a polymer-noble metal hybrid material is a platinum-polymer hybrid material. Embodiments of the invention contemplate the use of polymer-noble metal hybrid materials, which are chemically reactive with a surrounding electrolyte, when the polymer-noble metal hybrid material is insulated from a surrounding electrolyte by another material. Additionally, the conductive elements 314 may include a nonconductive polymer base coated with a conductive material, such as a noble metal.

Conductive elements 314 may include other conductive materials and/or metals. Conductive metals that may be used as the conductive elements 314 are those metals that are relatively inert to chemical reactions with the surrounding electrolyte. One material that may be used is graphite.

The conductive elements 314 may further include conductive fillers or conductive doping materials disposed in a binder material, such as the conductive polymers described above or a conventional polishing material. Examples of conductive fillers include carbon powder, carbon fibers, carbon nanotubes, carbon nanofoam, carbon aerogels, and combinations thereof. Carbon nanotubes are conductive hollow filaments of carbon material having a diameter in the micron and nanometer size range. The conductive fillers or conductive doping materials are disposed in the binding material in an amount sufficient to provide a conductive element 314 having a desired conductivity. The binder material is typically a polymer. The conductive elements 314 may alternatively be a conductive or dielectric material at least partially coated or covered with an at least partially conductive material such as those described above. In one embodiment, the conductive elements 314 are gold plated.

The conductive elements 314 generally have mechanical properties that do not degrade under sustained electric fields and are resistant to degradation in acidic or basic electrolytes. In one embodiment, the conductive elements 314 are compliant to maintain electrical contact between the entire contact surface 308 and the substrate during processing. For example, the conductive elements 314 may have a hardness of about 80 or less on the Shore D Hardness scale. In another aspect, conductive element 314 may have a hardness of about 50 or less on the Shore D Hardness scale for polymeric materials.

In the embodiment depicted in FIG. 3A, the conductive elements 314 are comprised of a conductive and compliant tubing fabricated from silicon filled with nickel-coated carbon. The conductive elements 314 are embedded in the polishing surface 302 in a parallel, spaced-apart relation at regular intervals. At least one aperture 310 is formed through the conductive pad 126 between each conductive element 314.

Figure 3B:
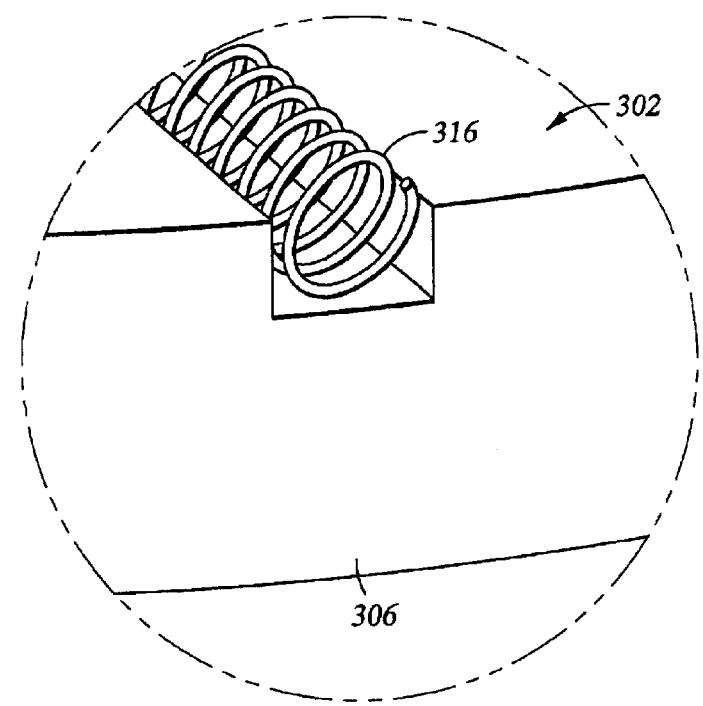

In another embodiment depicted in FIG. 3B, the conductive elements 314 are comprised of a spring 316. The spring 316 is fabricated or coated with an at least partially conductive material as described above.

Returning to FIG. 3A, a connector 312 is utilized to couple the conductive elements 314 to the power source 138 through the slip ring 140 (shown in FIG. 1) to electrically bias the conductive elements 314 while processing. The connector 312 is generally a wire, tape or other conductor compatible with process fluids or having a covering or coating that protects the connector 312 from the process fluids. The connector 312 may be coupled to the conductive elements 314 by soldering, stacking, brazing, clamping, crimping, riveting, fastening, conductive adhesive or by other methods or devices. Examples of materials that may be utilized in the connector 312 include insulated copper, graphite, titanium, platinum, gold, and HASTELOY® among other materials. Coatings disposed around the connectors 312 may include polymers such as fluorocarbons, PVC and polyimide. In the embodiment depicted in FIG. 3A, one connector 312 is coupled to each of the conductive elements 314 at the perimeter of the conductive pad 126. Alternatively, the connectors 312 may be disposed through the body 306 of the conductive pad 126. In yet another embodiment, the connector 312 may be coupled to a conductive grid (not shown) disposed in the pockets and/or through the body 306 that electrically couples the conductive elements 314.

Figure 3C:
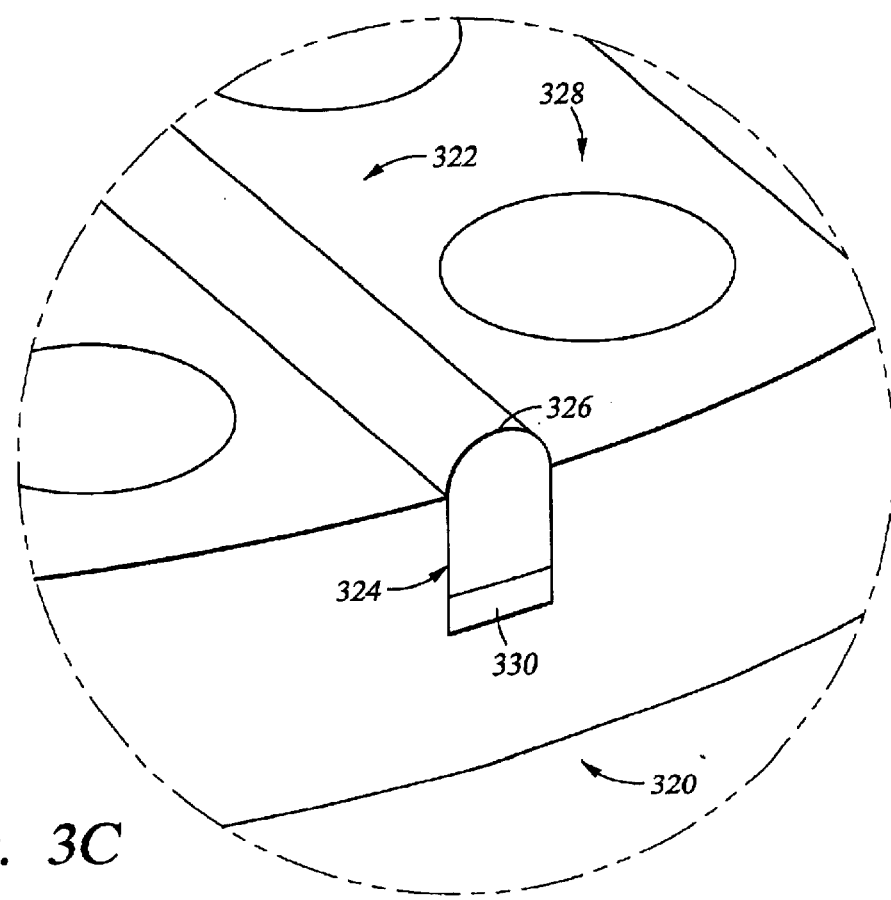

FIG. 3C depicts another embodiment of a conductive pad 320. The conductive pad 320 includes a conductive member 322 disposed in a pocket 324 formed therein. The conductive member 322 is generally an at least partially conductive bar, cylinder or coil that includes a contact surface 326 that extends above a plane defined by a polishing surface 328 of the conductive pad 320. The contact surface 326 is generally rounded to prevent damage to the substrate during processing.

A biasing member 330 is disposed between the conductive member 322 and the conductive pad 320. The biasing member 330 generally provides a bias that urges the conductive member 322 away from the conductive pad 320. The biasing member 330 is comprised of a resilient material or device and may be a compression spring, flat spring, coil spring, a foamed polymer such as foamed polyurethane (e.g., PORON®), an elastomer, a bladder or other member or device that urges the conductive member 322 away from the conductive pad 320.

Figure 3D:
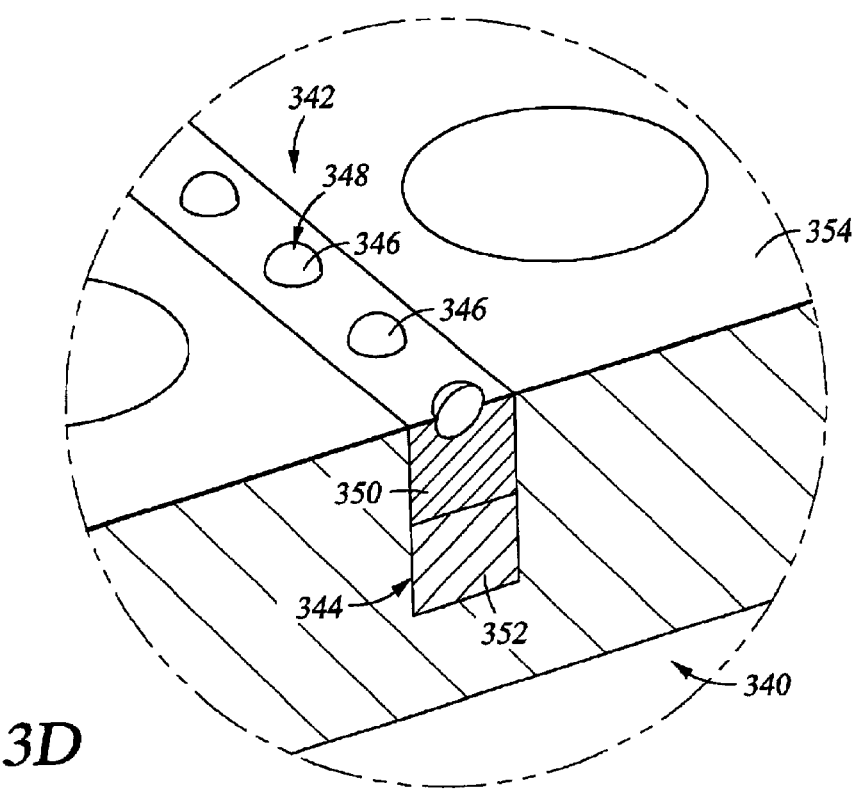

FIG. 3D depicts another embodiment of a conductive pad 340. A conductive member 342 is disposed in a pocket 344 of the conductive pad 340. The conductive member 342 generally comprises a plurality of pins or balls 346. The balls 346 are at least partially comprised and/or coated with an at least partially conductive material as described above. Each ball 346 includes a contact surface 348 that extends above a plane defined by the polishing surface 354 of the conductive pad 340. The contact surface 348 is generally rounded to prevent damage to the substrate during processing.

The balls 346 are disposed through a bushing 350 disposed in the pocket 344. The balls 346 may move through the bushing 350 so that the contact surface 348 of the balls 346 may become substantially coplanar with the polishing surface 354 when polishing.

A biasing member 352 is disposed between the conductive member 342 and the conductive pad 340. The biasing member 352 generally provides a bias that urges the conductive member 342 away from the conductive pad 340. The biasing member 352 is comprised of a resilient material or device and may be a compression spring, flat spring, coil spring, a foamed polymer such as foamed polyurethane (e.g., PORON®), an elastomer, a bladder or other member or device that urges the conductive member 342 away from the pad 340. Typically, at least one of the biasing members 352 or the bushing 350 comprises a conductive material or coating that electrically couples the balls 346.

Figure 3E:
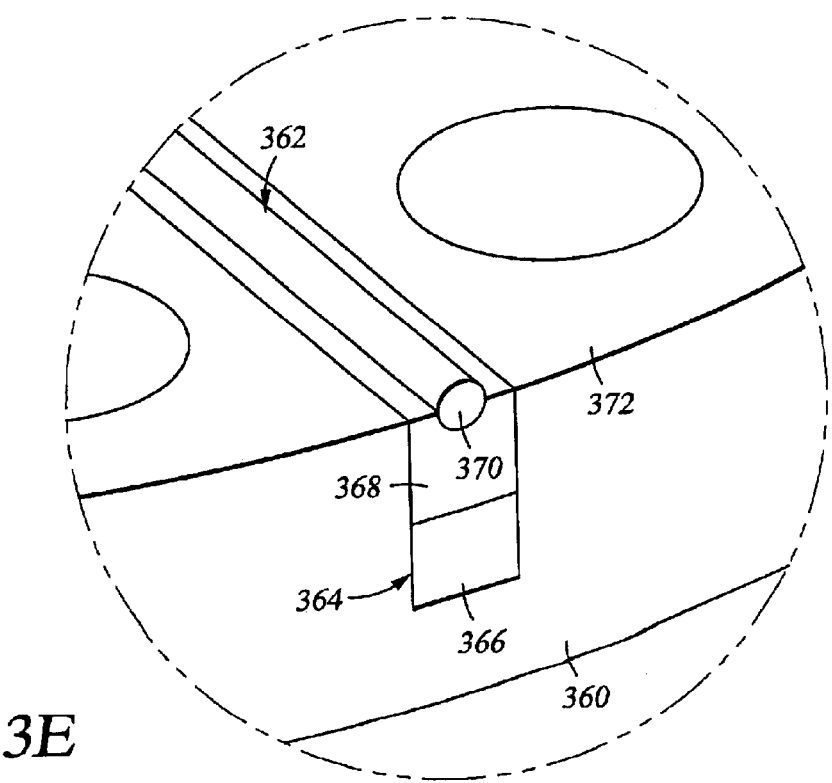

FIG. 3E depicts another embodiment of a conductive pad 360. The conductive pad 360 generally includes a conductive member 362 disposed in pockets 364 of the conductive pad 360. The conductive member 362 generally includes a carrier 368 and a contact member 370. A biasing member 366 similar to the biasing member 330 described above is disposed between the carrier 368 and the conductive pad 360 for urging the contact member 370 to a position at least partially above a plane defined by a polishing surface 372 of the conductive pad 360.

The carrier 368 is typically formed from a conductive material such as graphite or a metal or other material compatible with process chemistries as described above. Alternatively, other materials such as semiconductors or dielectric may be utilized. The carrier 368 is configured to remain in contact with the contact member 370 during processing.

The contact member 370 is typically formed from a conductive material such as graphite or a metal or other at least partially conductive material compatible with process chemistries as described above. The contact member 370 is typically a cylinder, coil, bar or ball although other shapes may be utilized. In the embodiment depicted in FIG. 3E, the contact member 370 is a graphite rod seated on a graphite carrier 368. Alternatively, the contact member 370 may be a plurality of graphite or gold balls seated on and electrically coupled through a graphite carrier 368.

Figure 3F:
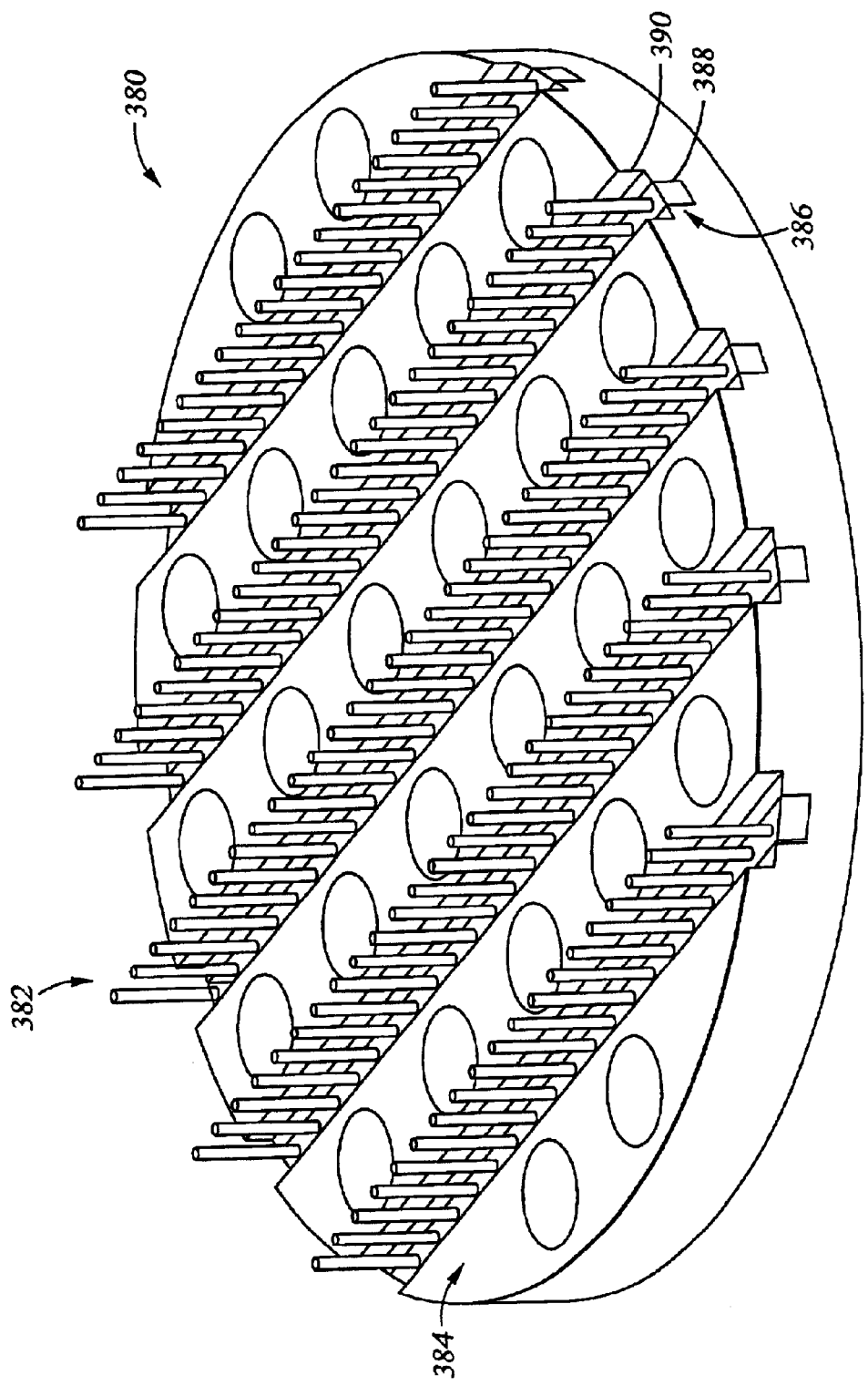

FIG. 3F depicts another embodiment of a conductive pad 380. The conductive pad 380 includes one or more at least partially conductive elements 382 disposed on a polishing surface 384. The conductive elements 382 generally comprise a plurality of fibers, strands and/or flexible fingers that contact the substrate while processing. The conductive elements 382 are typically comprised of an at least partially conductive material as described above. In the embodiment depicted in FIG. 3F, the conductive elements 382 are a brush comprised of electrically conductive fibers, such as carbon fibers or other conductive, compliant (i.e., flexible) element made from material described above.

The conductive elements 382 generally are disposed in a pocket 386 formed in the polishing surface 384. The conductive elements 382 may be orientated between 0 and 90 degrees relative to the polishing surface 384. In embodiments where the conductive elements 382 are orientated parallel to the polishing surface 384, the conductive elements 382 may partially be disposed on the polishing surface 384.

The pockets 386 have a lower mounting portion 388 and an upper, clearance portion 390. The mounting portion 388 is configured to retain the conductive elements 382 by press fit, clamping, adhesives or by other methods. The clearance portion 390 is disposed where the pocket 386 intersects the polishing surface 384. The clearance portion 390 is generally larger in cross section than the mounting portion 388 to allow the conductive elements 382 to flex when contacting a substrate while polishing without being disposed between the substrate and the polishing surface 384.

Figure 4:
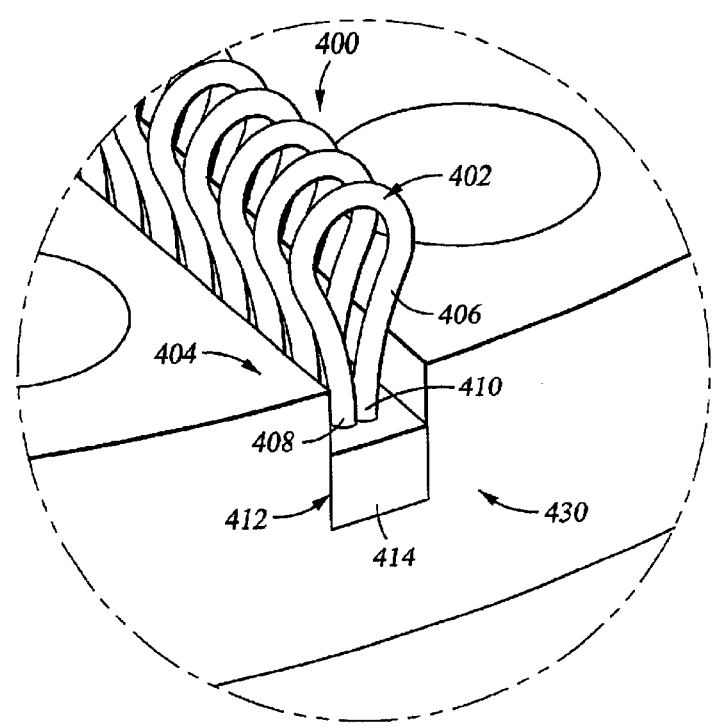
FIG. 4 is a partial sectional view of one embodiment of a conductive element of a conductive pad.

FIG. 4 depicts one embodiment of a brush 400 comprised of conductive elements 402 (only four are shown for clarity). The brush 400 is generally orientated between 0 to 90 degrees relative to a polishing surface 404 of a polishing pad 430 and can be inclined in any polar orientation relative a line normal to the polishing surface 404. Each conductive element 402 generally comprises a ring or loop 406 having a first end 408 and a second end 410 disposed in a pocket 412 formed in the polishing surface 404. Each conductive element 402 is typically electrically coupled to an adjoining conductive element to form a plurality of loops 406 extending above the polishing surface 404. The ends 408, 410 of the loops 406 may be secured in a conductive tray 414 disposed in the pocket 412 to facilitate electrical connections and replacement of the conductive elements 402. In the embodiment depicted in FIG. 4, each loop 406 may be fabricated from graphite, carbon fibers, made of twisted metal wires, for example, gold, stainless steel and platinum, as well as polymer fibers coated with conductive metals, among others. In one embodiment, a polymer fiber may be plated with a conductive metal.

Figure 5A:
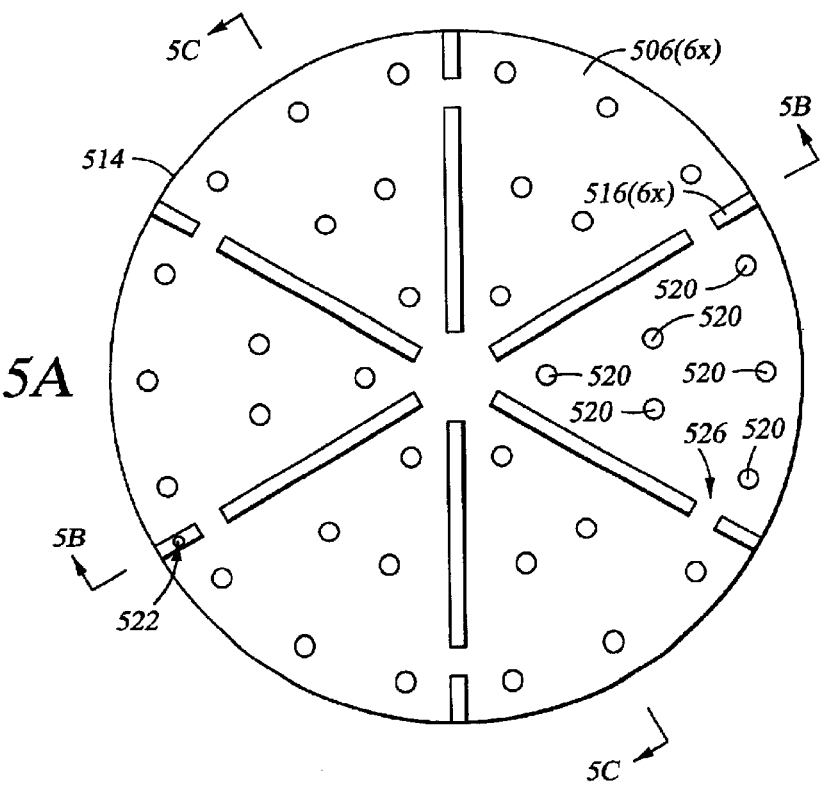
FIGS. 5A–C are bottom plans and partial sectional views of one embodiment of a spacer.
Figure 5B:
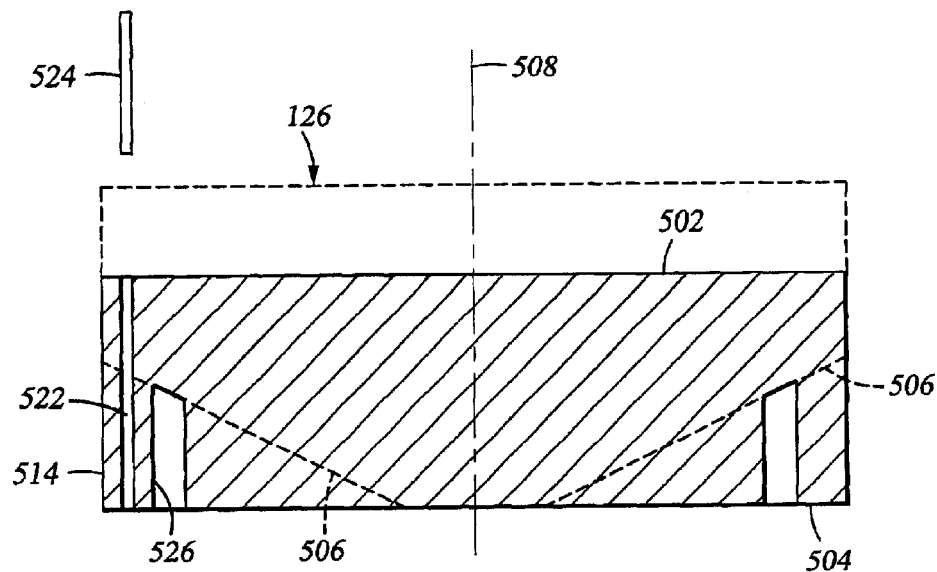
Figure 5C:
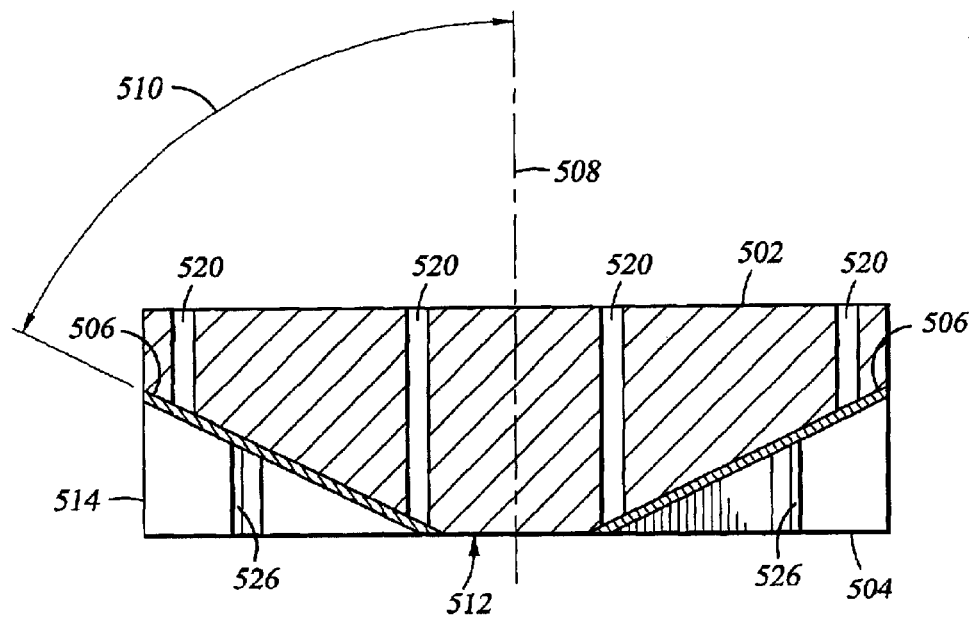

FIGS. 5A–C are bottom and sectional views of one embodiment of the spacer 124. The spacer 124 is typically fabricated from a material resistant to process chemistry which will not detrimentally affect polishing performance, for example a ceramic or polymer material such as fluoropolymers (for example, TEFLON®), polyethylene (PE), polyfluoroalkoxy resin (PFA), polyethersulfone (PES), high density polyethylene (HDPE), ultra high molecular weight polyethylene (UHMW), polyphenylene sulfide (PPS) and the like among others. The spacer 124 generally supports the conductive pad 126 on a first side 502 within the tray 118. The first side 502 is orientated perpendicular to an axis of rotation 508 of the spacer 126. A second side 504 is generally disposed on the electrode 120 or the tray 118. The second side 504 generally includes an angled surface 506 that is disposed at an angle 510 less than 90 degrees. Typically, the angle 510 is greater than about 75 degrees, and in one embodiment, is about 88.5 degrees. The angular orientation of the angled surface 506 results in the spacer 124 being thicker at a center 512 relative to an edge 514 of the spacer 124.

The second side 504 may additionally include a plurality of stiffening ribs 516. The stiffening ribs 516 are generally configured to provide parallelism between the first and second sides 502, 504 of the spacer 124 so that the conductive pad 126 remains perpendicular to the rotational axis 508 during processing. In embodiments where stiffening ribs are not utilized, at least one of the spacer 124, tray 118 or other intermediate component is configured to maintain the perpendicular orientation between the axis 508 and conductive pad 126.

The stiffening ribs 516 generally add rigidity to the spacer 124 and prevent deflection of the first side 502 that disturbs the planarity of the conductive pad 126 supported thereon, resulting in poor polishing performance. The stiffening ribs 516 may optionally include one or more notches, channels, holes or other passages 526 that allow electrolyte flow between angled surfaces 506 disposed to adjacent sides of each rib 516.

The spacer 124 is perforated or permeable to the electrolyte to facilitate the flow of electrolyte to the substrate through the conductive pad 126. In one embodiment, a permeable ceramic spacer having a thickness of about 0.5 inches and a pore size of about 100 microns was demonstrated to have acceptable polishing results. Different pore size and spacer thickness may be utilized to achieve a desired flow rate of electrolyte through the spacer 124 for a particular process.

In the embodiment depicted in FIGS. 5A–C, the spacer 124 includes a plurality of apertures 520 formed therethrough to allow electrolyte through the spacer 124. The size and density of the apertures 520 are selected to provide uniform distribution of the electrolyte through the spacer 124 to the substrate 108. In one aspect, the spacer 124 includes apertures 520 having a diameter between about 0.5 mm and about 10 millimeters. The apertures 520 may have a density between about 30 percent and about 80 percent of the polishing media. Density of the apertures 520 of about 50 percent has been observed to provide electrolyte flow with minimal detrimental effects to polishing processes. Generally, the apertures 520 of the spacer 124 and the conductive pad 126 may be aligned to provide for sufficient mass flow of electrolyte through the spacer 124 and conductive pad 126 to the substrate surface. In the embodiment depicted in FIGS. 5A–C, at least one alignment hole 522 is formed through the spacer 124 and adapted to accept a pin or fastener 524 disposed between the conductive pad 126 and spacer 124.

FIG. 5C depicts one embodiment of the membrane 122 disposed adjacent the angled surface 506. The membrane 122 is generally permeable, thereby allowing the electric field lines, electrolyte and other liquids and diffused gases to pass therethrough. The membrane 122 generally prevents particles, sludge and gas bubbles released from the electrode 120 from passing through the electrolyte and contacting the substrate 120. Additionally, as the membrane 122 is maintained at the same non-horizontal orientation as the angled surface 506, bubbles entrained in the electrolyte (typically hydrogen gas generated at the electrode 120 during processing) are substantially prevented from accumulating on the membrane 122 as the inclination of the membrane 122 redirects the bubbles radially towards the edge 514 of the spacer 124 where they can escape between the pad 126 and the walls of the tray 118. This radial movement of the hydrogen bubbles is additionally driven by the centrifugal force generated by the rotating basin assembly 104. The diverted bubbles thus pass around the pad 126 and therefore do not come in contact with the substrate 108 where diminished polishing performance could result. Thus, the amount of hydrogen gas bubbles permeating the membrane 122 is substantially reduced resulting in improved polishing of the substrate.

The membrane 122 is typically fabricated from a porous ceramic or polymer material that is compatible with process chemistries and does not increase the cell electrical resistance. The pore size is generally selected to between about 0.1 and 10 micron. In one embodiment, the membrane 122 is fabricated from a non-woven polymer film such as TYVEK®. In the embodiment depicted in FIGS. 5A–C, the membrane 122 comprises a plurality of membrane elements 506 arranged in a polar array that substantially cover at least the angled surfaces 506 of the spacer 124. Alternatively, the membrane 122 may comprise a single element.

Figure 6:
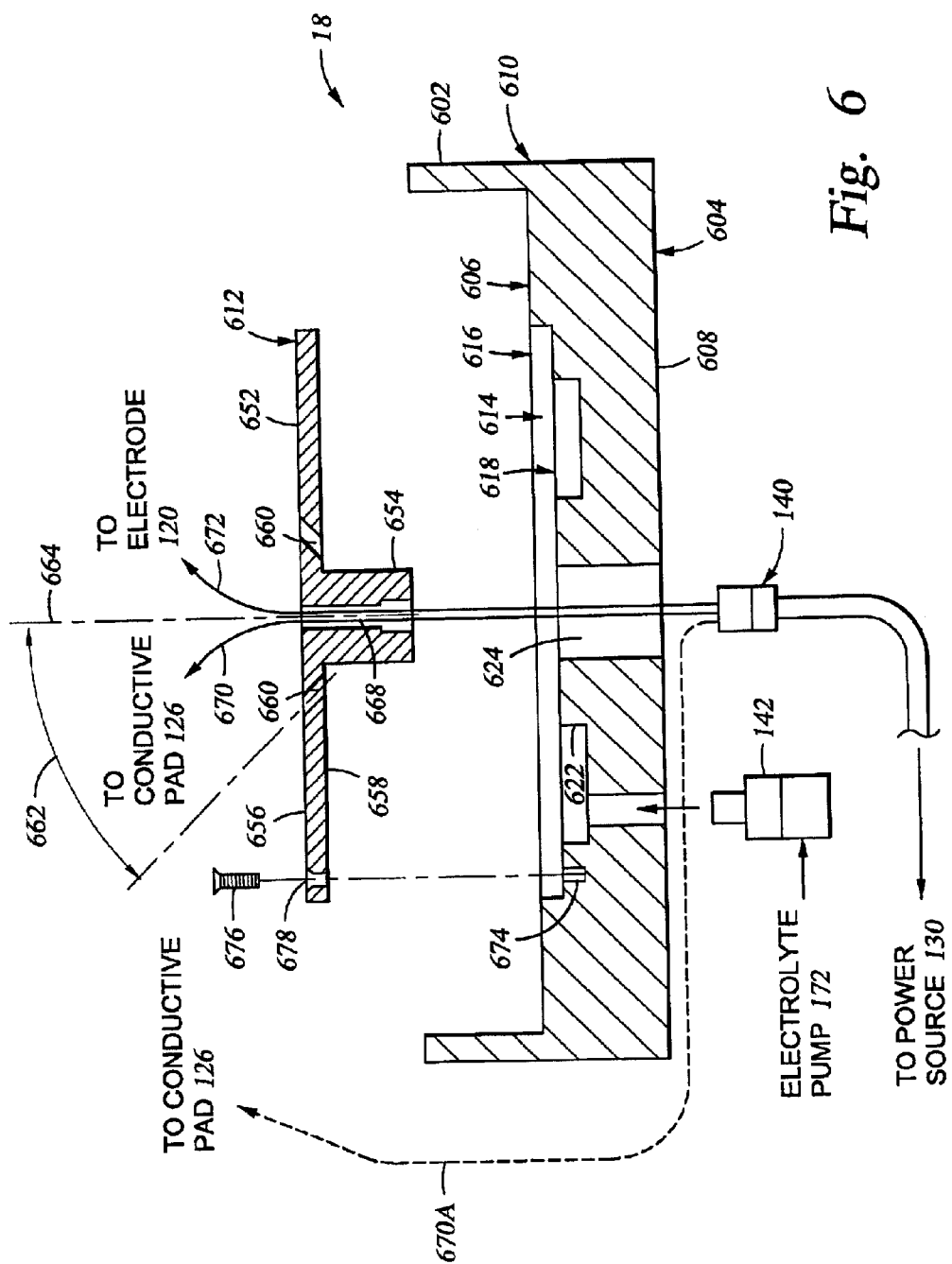
FIG. 6 is an expanded sectional view of one embodiment of a tray.

FIG. 6 depicts a sectional view of one embodiment of a tray 118. The tray 118 is generally comprised of a basin 610 and a plenum cap 612. The basin 610 and a plenum cap 612 are generally made of a plastic such as fluoropolymers, TEFLON®, PFA, PE, PES, or other materials that are compatible with electroplating and electropolishing chemistries.

The plenum cap 612 generally has a cap plate 652 having a cap boss 654 extending from a first side 656. At least one aperture 660 is formed through the cap plate 652 between the first side 656 and a second side 658. The apertures 660 generally allow electrolyte to pass through the plenum cap 612. The apertures 660 are generally orientated at an acute angle 662 relative to a centerline 664 of the plenum cap 612. In one embodiment, eight (8) apertures 660 extend through the plenum cap 612 in a polar array.

The plenum cap 612 may be coupled to the basin 610 through a variety of devices and methods. For example, the plenum cap 612 may be adhered, press fit, staked, bonded or clamped to the basin 610. In the embodiment depicted in FIG. 6, the cap plate 652 has a plurality of holes 678 (one is shown) formed therethrough that respectively accept a fastener 676 that threads into a hole 674 formed in the basin 610.

The cap boss 654 generally includes a passage 668 formed therethrough. The passage 668 allows leads 670 and 672 respectively coupled to the conductive pad 126 and electrode 120 through the slip ring 140 disposed below the tray 118. The lead 670 may be alternatively routed around the exterior of the basin 610 as shown by dashed line 670A.

The basin 610 generally defines a container or electrolyte cell in which a conductive fluid such as the electrolyte can be confined. The basin 610 may be stationary or be driven to provide at least a portion of a relative motion between the substrate 108 and the polishing head 102.

The basin 610 includes a sidewall 602 and a bottom 604. The sidewall 602 is configured to have sufficient height that retains the electrode 120, the membrane 122, the spacer 124 and the conductive pad 126. The height of the sidewalls 602 additionally provides adequate depth of electrolyte above the conductive pad 126 so that the substrate retained in the polishing head 102 is wetted by electrolyte during processing to ensure a conductive path between the substrate and electrode 120 through the conductive pad 126.

The bottom 604 of the basin 610 generally has an interior side 606 and an exterior side 608. The interior side 606 of the basin bottom 604 generally supports the electrode 120. The interior side 606 additionally includes a stepped recess 614. The stepped recess 614 includes a cap receiving portion 616 that accepts at least a portion of the plenum cap 612 and a second portion 618 typically disposed concentrically and radially inwards of the cap receiving portion 616. The plenum cap 612 and the bottom 604 generally bound the second portion 618 to define a plenum that receives electrolyte flowing into the tray 118.

An inlet 620 is formed through the bottom 604 to fluidly couple the second portion 618 to the source of electrolyte used during processing. In one embodiment, electrolyte from the settling tank 174 is driven by the pump 172 through the rotary union 142 and into second portion 618 (i.e., plenum) by a conduit (not shown) coupled between the pump 172 and inlet 620. The apertures 660 of the plenum cap 612 may be configured to restrict the flow of electrolyte so that the electrolyte is uniformly distributed about the second portion 618, resulting in uniform flow of electrolyte through the plenum cap 612 and to the substrate 108 (after passing through the other components disposed in the basin 610).

The second portion 618 of the stepped recess 614 has a boss 622 extending from the bottom 604 towards the first side 606 of the basin 610. The boss 622 generally supports the cap plate 652 of the plenum cap 612 and circumscribes a center passage 624 disposed through the bottom 608 of the basin 610. The center passage 624 accepts the cap boss 654 to locate the plenum cap 612 and basin 610 when assembled while allowing routing of the leads 670, 672.

Returning to FIG. 1, the electrode 120 is generally disposed between the tray 118 and the membrane 122. The electrode 120 is coupled to the power source 138 by a lead (not shown) disposed through the tray 118 between the slip ring 140 and the electrode 120. The electrode 120 generally is a counter-electrode to the substrate 108 and/or conductive pad 126 contacting the substrate surface. The conductive pad 126 is at least partially conductive and may act as an electrode in combination with the substrate during electrochemical processes, such as an electrochemical mechanical plating process (ECMPP), and electrochemical mechanical polishing (ECMP). The electrode 120 may be an anode or cathode depending upon the positive bias (anode) or negative bias (cathode) applied between the electrode 120 and conductive pad 126.

For example, when depositing material from an electrolyte onto the substrate surface, the electrode 120 acts as an anode and the substrate surface and/or conductive pad 126 acts as a cathode. When removing material from a substrate surface, such as by dissolution from an applied bias, the electrode 120 functions as a cathode and the substrate surface and/or conductive pad 126 acts as an anode for the dissolution process.

The level of the electrolyte within the tray 118 is maintained at a level that ensures that the electrode 120 and conductive pad 126 are wetted by the electrolyte to ensure current flow therebetween during processing. The electrode 120 typically is comprised of the material to be deposited or removed, such as copper, aluminum, gold, silver, tungsten and other materials which can be electrochemically deposited on the substrate 108. For electrochemical removal processes, such as anodic dissolution, the electrode 120 may include a non-consumable electrode of a material other than the deposited material, such as platinum for copper dissolution. The non-consumable electrode is used in planarization processes combining both electrochemical deposition and removal. The electrode 120 is permeable to the electrolyte, and can be a plate-like member, a plate having multiple holes formed therethrough or a plurality of electrode pieces disposed in a permeable membrane or container.

Figure 7:
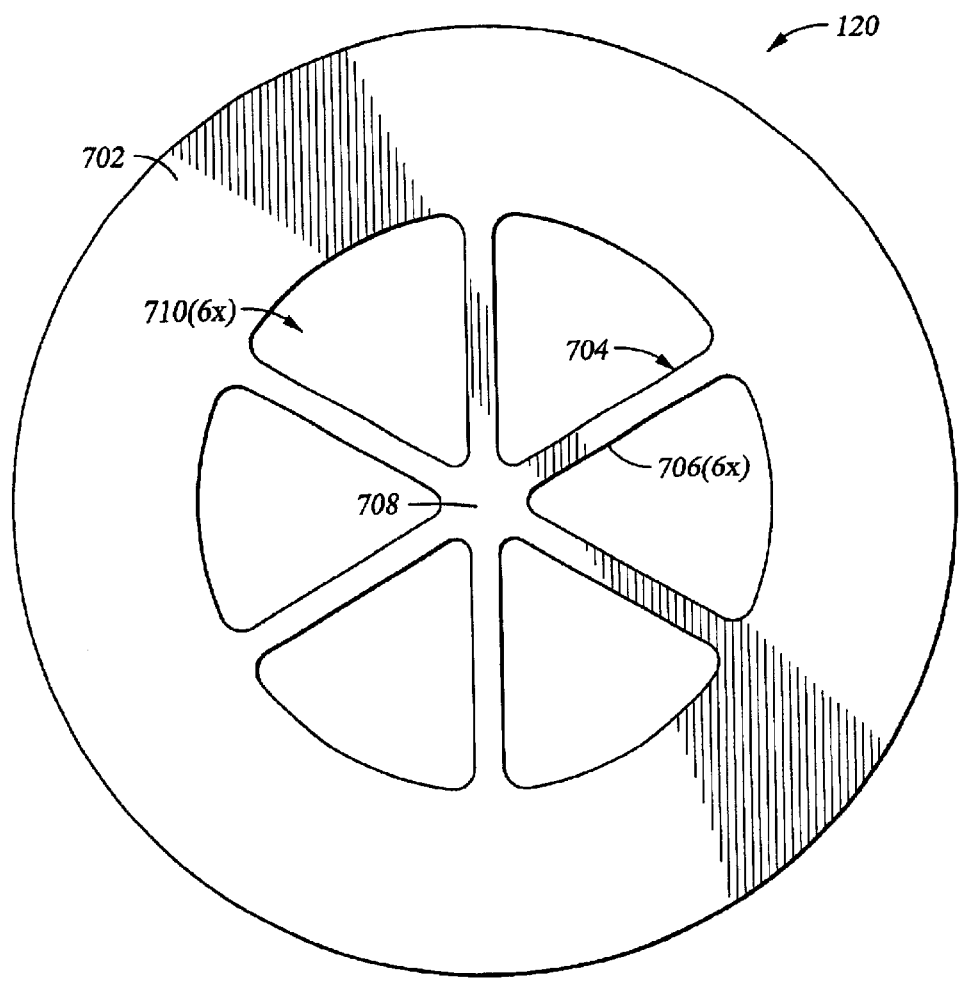
FIG. 7 is a perspective view of one embodiment of an electrode.

FIG. 7 depicts one embodiment of the electrode 120. The electrode 120 generally includes an annular outer portion 702 and an inner web portion 704. The inner web portion 704 is generally configured to have a percentage of open areas 710 that allows electrolyte to flow from the apertures 660 of the plenum cap 612 (see FIG. 6) substantially unobstructed. In one embodiment, the web portion 704 comprises a plurality of radially arranged spokes 706 that meet at a central hub 708. The hub 708 generally provides a central location for the electrode 120 to be coupled to the power source 138 by the lead 672, thus uniformly biasing the electrode 120 across its diameter. The web portion 704 may alternatively be configured having other geometric or random patterns.

An exemplary mode of operation of the processing cell 100 is described as follows with reference to FIG. 1. In operation, the substrate 108 is retained in the polishing head 102 and moved over the conductive pad 126 disposed in the basin 104. The polishing head 102 is lowered towards the tray 118 to place the conductive pad 126 in contact with the substrate 108 or at least proximate thereto. Electrolyte is supplied to the basin assembly 104 and flows through the electrode 120 and conductive pad 126 to a level that contacts the substrate 108. Substantially all of the hydrogen or other gas bubbles entrained in the electrolyte are separated from the electrolyte, flowing outwards along the inclined membrane 122 and away from the substrate as the electrolyte passes through the membrane 122. Electrolyte flows over the tray 118 and into the catch basin 128 where it is directed to the electrolyte delivery system 132 of recycling.

A bias voltage is applied from the power source 138 between the conductive pad 126 and the electrode 120 through the rotary union 140. The bias between conductive pad 126 and the electrode 120 results in the removal of conductive material, such as copper, disposed on the surface of the substrate 108, by an anodic dissolution method.

The substrate 108 and conductive pad 126 are moved relative to one another to uniformly polish the substrate surface. A contact force of about 6 psi or less is typically used to hold the substrate 108 against the conductive pad 126. A contact force of about 2 psi or less may be used when polishing substrates containing low dielectric constant material.

In anodic dissolution, the bias is applied to the electrode 120, performing as a cathode, and the conductive pad 126 and the substrate 108, performing as the anode. The application of the bias allows removal of deposited material from the substrate surface. The bias may include the application of a voltage of about 15 volts or less to the substrate surface. A voltage between about 0.1 volts and about 10 volts may be used to dissolve copper-containing material from the substrate surface into the electrolyte. Alternatively, the bias may be a current density between about 0.1 milliamps/cm$^2$ and about 50 milliamps/cm$^2$, or between about 0.1 amps to about 20 amps for a 200 mm substrate. It is believed that biasing the substrate via the conductive pad 126 provides uniform dissolution of conductive materials, such as metals, into the electrolyte from the substrate surface as compared to conventional polishing devices which bias the substrate through the substrate's perimeter.

The bias applied to perform the anodic dissolution process may be varied in power and application, depending on the user requirements in removing material from the substrate surface. For example, a time varying anodic potential may be provided to the conductive pad 126. The bias may also be applied by electrical pulse modulation techniques. In one embodiment, a electrical pulse modification technique includes applying a constant current density or voltage over the substrate for a first time period, then applying a constant reverse voltage over the substrate for a second time period, and repeating the first and second steps. For example, the electrical pulse modification technique may use a varying potential from between about −0.1 volts and about −15 volts to between about 0.1 volts and about 15 volts.

Conductive materials can be removed from at least a portion of the substrate surface at a rate of about 15,000 Å/min or less, such as between about 100 Å/min and about 15,000 Å/min. In one embodiment of the invention where the copper material to be removed is less than 12,000 Å thick, the voltage may be applied to the conductive pad 126 to provide a removal rate between about 100 Å/min and about 8,000 Å/min.

Figure 8:
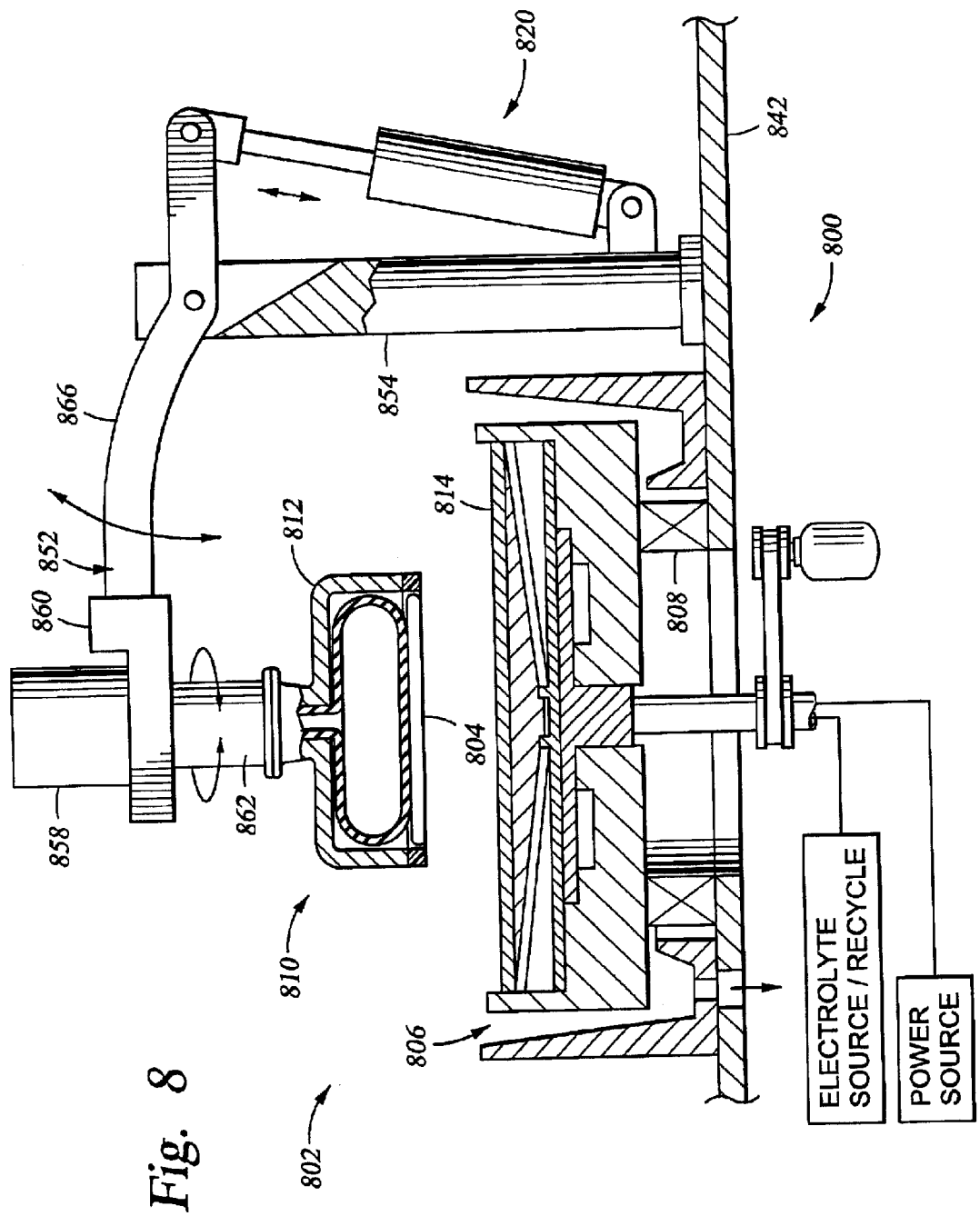
FIG. 8 is a sectional view of one embodiment of a polishing system.

FIG. 8 depicts one embodiment of a polishing system 800 having a process cell 802 suitable for electrochemical deposition and/or chemical mechanical polishing, such as electrochemical mechanical polishing (ECMP) or electrochemical mechanical plating processes (ECMPP) station. The process cell 802 generally includes a base 842 having a basin assembly 806 disposed thereon and a head assembly 810 supported over the basin assembly 806 by a head assembly frame 852. The basin assembly 806 is generally similar to the basin assembly 104 described above, and may be coupled to or rotated above the base 842 on one or more bearings 808 (one is shown).

The head assembly 810 includes a polishing head 812 that retains a substrate 804 and can move to place the substrate 804 in contact with a conductive polishing pad 814 retained in the basin assembly 806 during processing. The polishing head 812 is generally similar to the polishing head 102 described above.

The head assembly 810 is generally mounted onto the head assembly frame 852 that includes a mounting post 854 and a cantilever arm 856. The mounting post 854 is mounted to the base 842 of the polishing system 800, and the cantilever arm 856 extends laterally from an upper portion of the mounting post 854. The mounting post 854 may provide rotational movement with respect to a vertical axis along the mounting post to allow the head assembly 810 to move laterally. The head assembly 810 is attached to a mounting plate 860 disposed at the distal end of the cantilever arm 856. The lower end of the cantilever arm 856 is connected to a cantilever arm actuator 820, such as a pneumatic cylinder, mounted on the mounting post 854. The cantilever arm actuator 820 provides pivotal movement of the cantilever arm 856 with respect to the joint between the cantilever arm 856 and the mounting post 854. When the cantilever arm actuator 820 is retracted, the cantilever arm 856 moves the head assembly 810 away from the basin assembly 806 to provide the spacing required to remove or load the substrate from the basin assembly 806 of the polishing system 800. When the cantilever arm actuator 820 is extended, the cantilever arm 856 moves the head assembly 810 and substrate 804 toward the basin assembly 806 to contact the conductive polishing pad 814 retained in the basin assembly 806.

The head assembly 810 generally comprises the polishing head 812 and a polishing head actuator 858. The polishing head actuator 858 is coupled to the mounting plate 860, and includes a head shaft 862 extending downwardly through the mounting plate 860. The lower end of the head shaft 862 is connected to the polishing head 812 to allow vertical movement of the polishing head 812.

The substrate actuator 858 additionally may be configured to provide rotary motion to the polishing head 812. Relative motion between the substrate and the polishing head 812 during the anodic dissolution process typically enhances the polishing results. The polishing head 812 can also be rotated as the polishing head 812 is lowered to contact the substrate with the conductive polishing pad 814 disposed in the basin assembly 806 as well as when the polishing head 812 is in a raised or partially raised position. In a raised or partially raised position, the head 812 may be spun to remove electrolyte from the polishing head 812.

Figure 9:
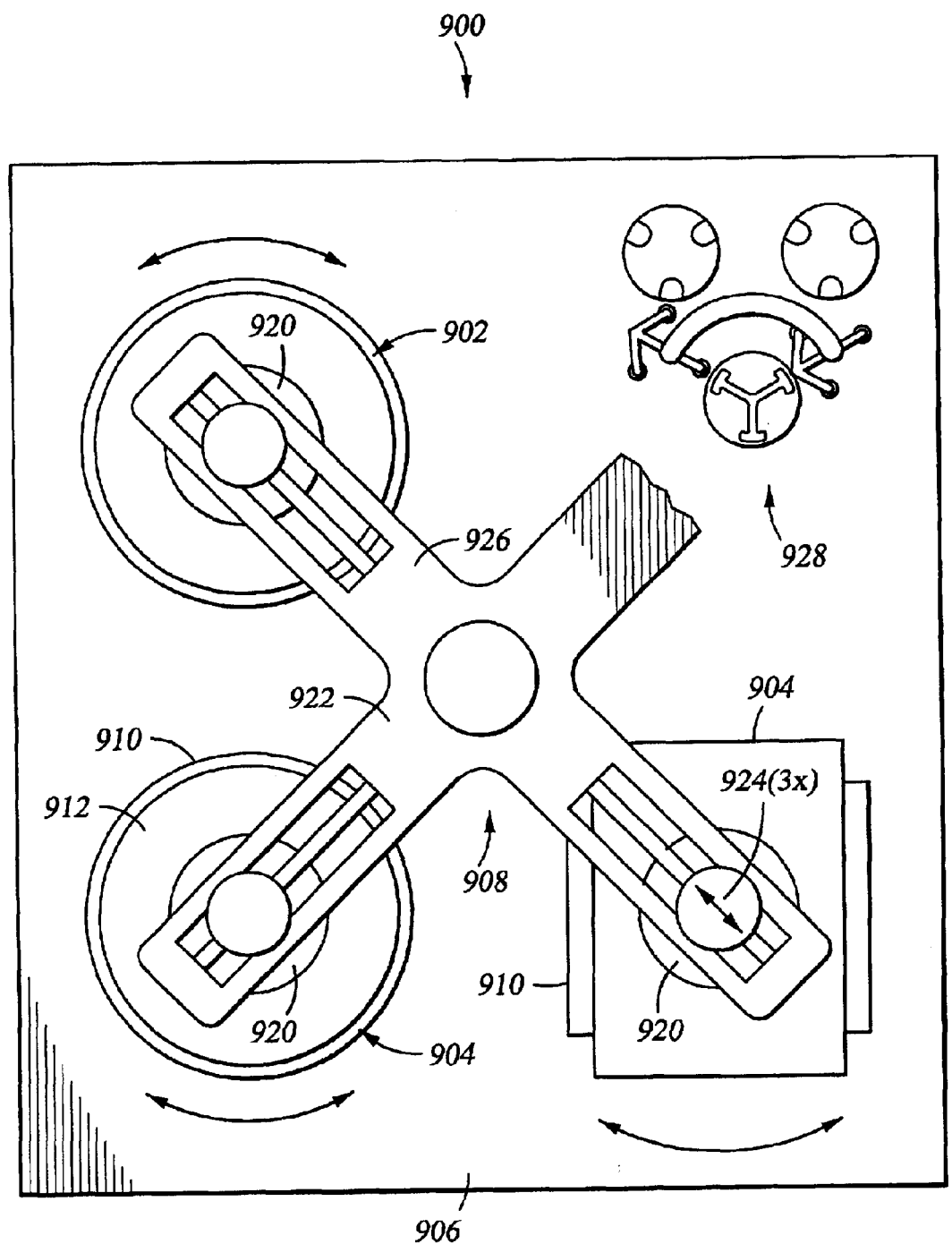
FIG. 9 is a plan view of another embodiment of a polishing system.
Figure 2:
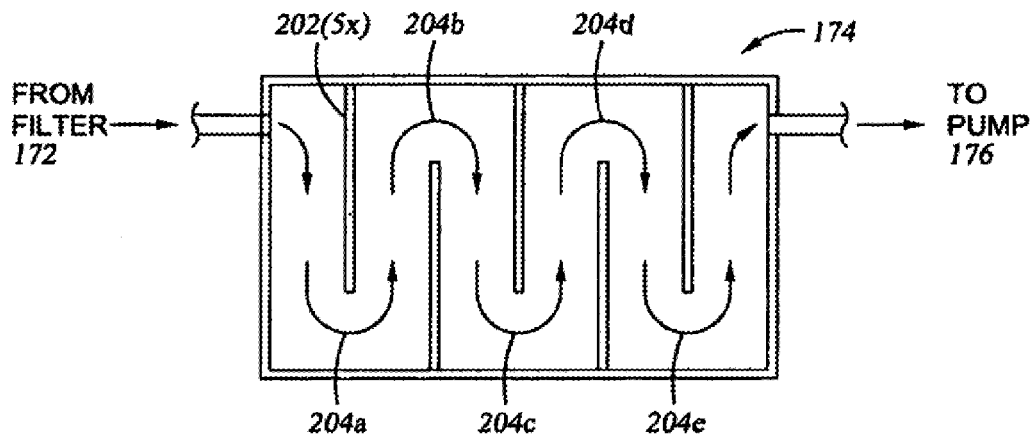
Figure 3A:
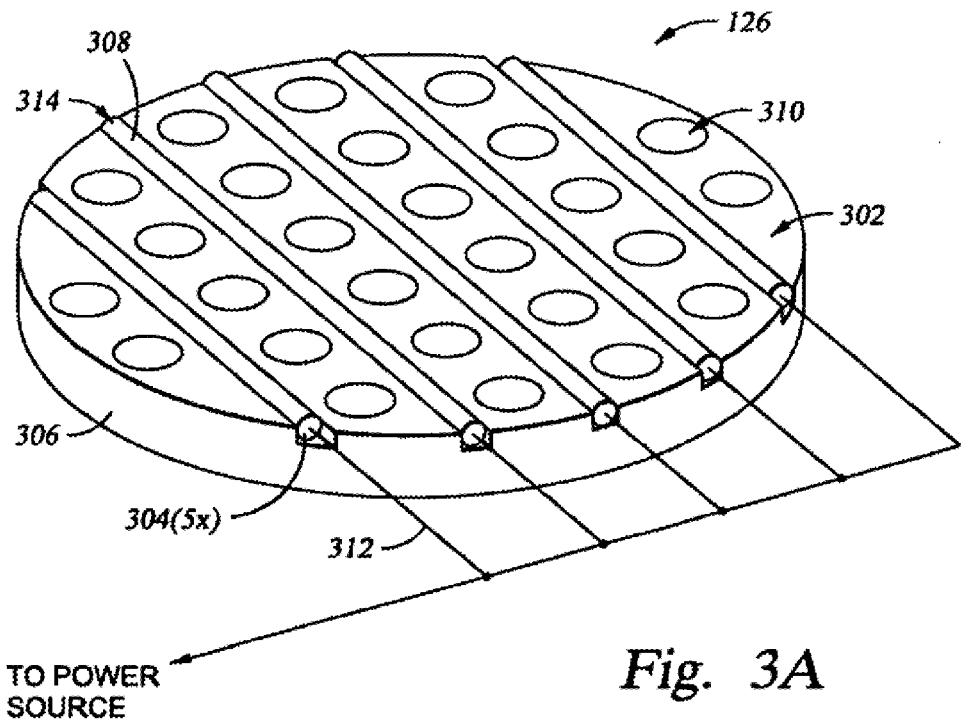
Figure 4:
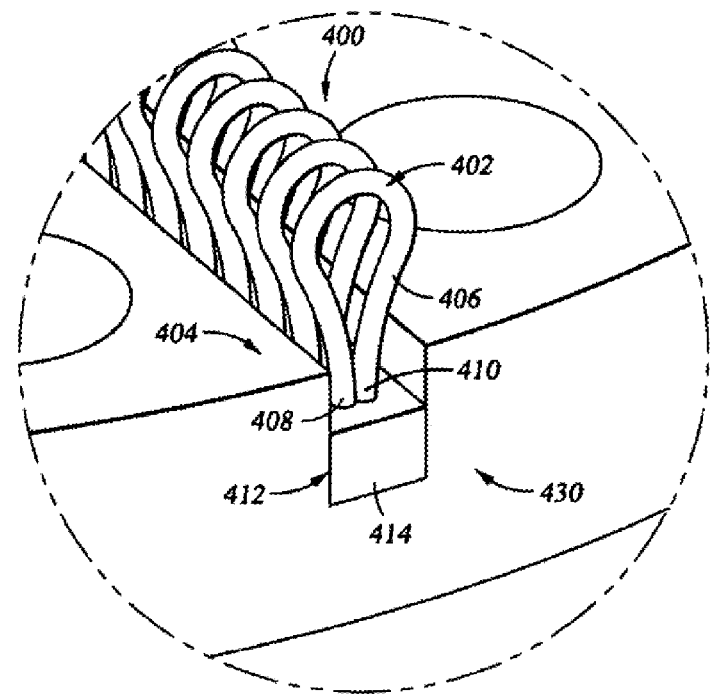
Figure 5A:
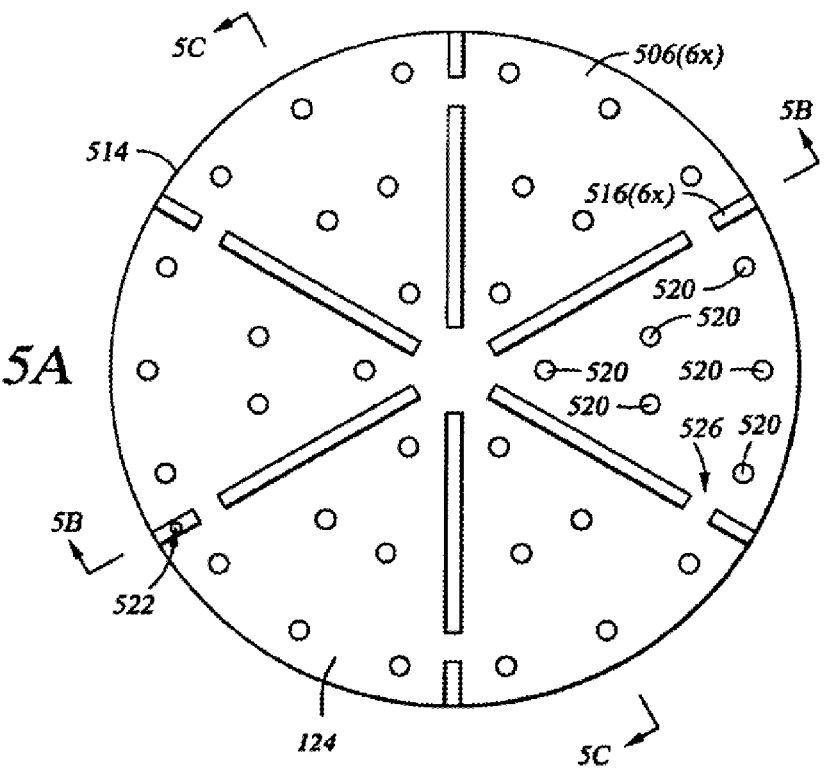
Figure 5B:
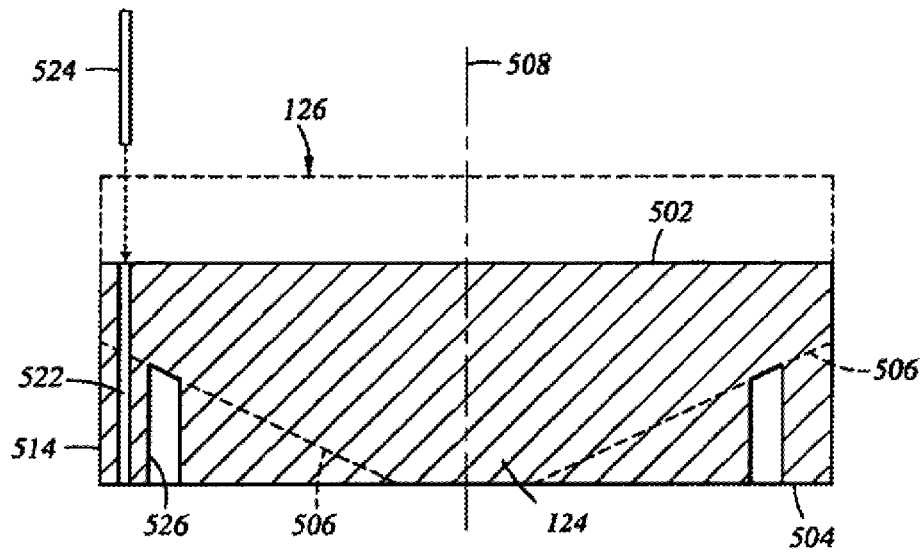
Figure 5C:
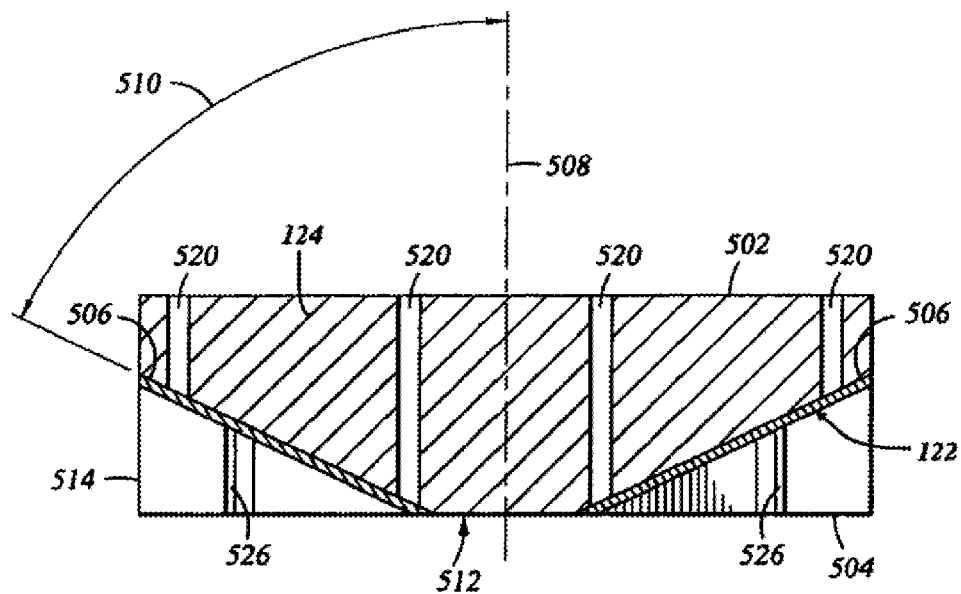
Figure 6:
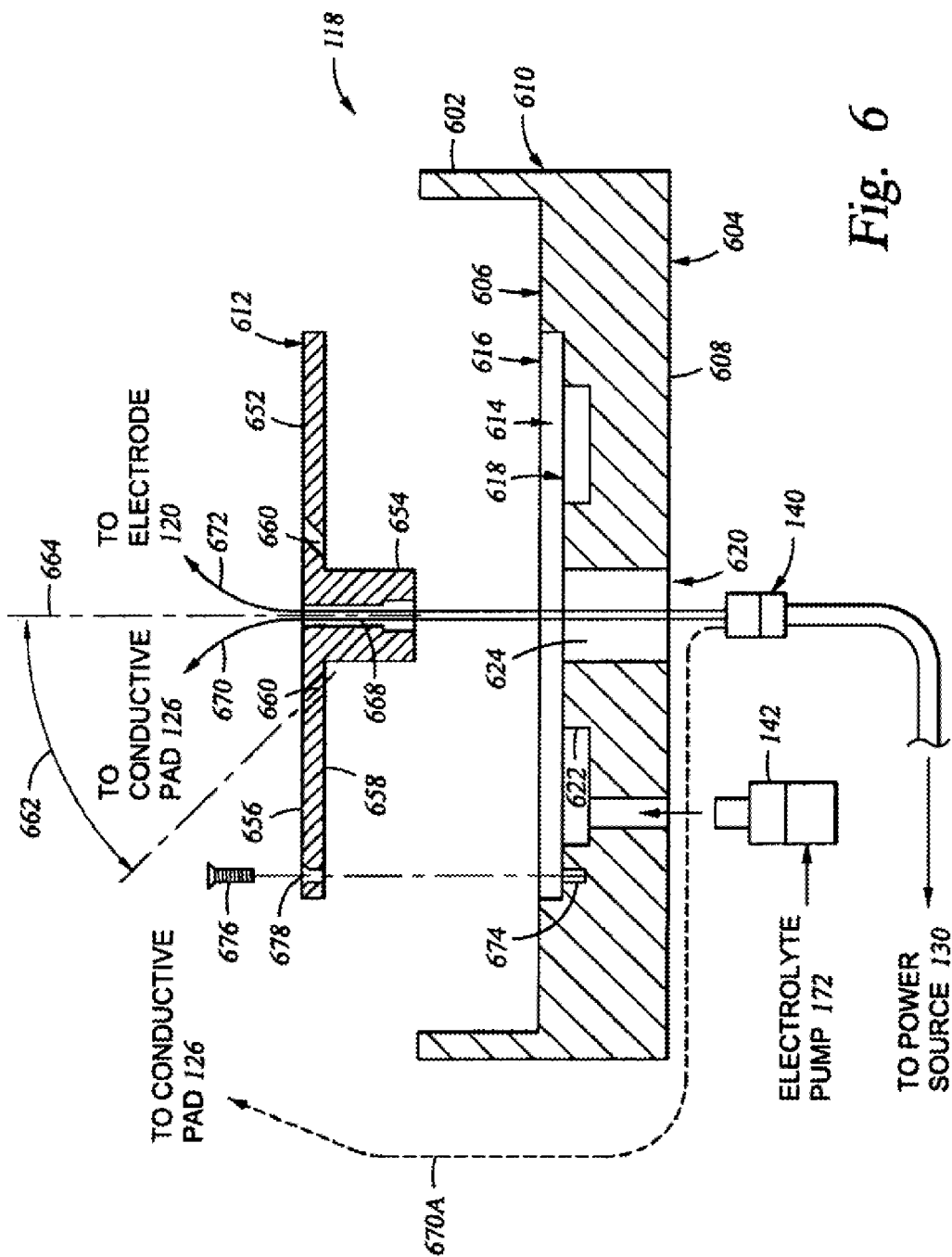

FIG. 9 depicts one embodiment of a polishing system 900 having at least one process cell 902 suitable for electrochemical deposition and/or chemical mechanical polishing, such as electrochemical mechanical polishing (ECMP) station and chemical mechanical polishing station 904 disposed on a base 906 and having substrate transfer mechanism 908 for transferring substrates between the process cell 902 and polishing station 904. The process cell 902 is generally similar to the processing cell 100 described above.

The transfer mechanism 908 generally includes at least one polishing head 920 (three are shown) similar to the polishing head 102 described above. In the embodiment depicted in FIG. 9, the transfer mechanism 908 includes a transfer device such as a carousel 922 that rotatably supports a plurality of polishing heads 920 on an arm 926. One arm 926 is removed to show a transfer station 928. One transfer station that may be adapted to benefit from the invention is described in U.S. Pat. No. 6,156,124, issued Dec. 5, 2000 to Tobin, which is hereby incorporated herein by reference in its entirety.

Each polishing head 920 may be selectively positioned above one of the process cells 902 and polishing stations 904 to process the substrate. A substrate may be processed sequentially in any of the process cells 902 and/or polishing stations 904 while remaining retained in a single polishing head 920. A drive system 924 is coupled to each of the polishing heads 920 to facilitate at least a portion of the polishing motion between the substrate and the process cell 902 or polishing station 904 positioned therebelow. One transfer mechanism that may be adapted to benefit from the invention is described in U.S. Pat. No. 5,738,574, issued Apr. 14, 1998 to Tolles et al., which is hereby incorporated herein by reference in its entirety.

The polishing station 904 generally includes a rotatable platen 910 that supports a polishing material 912. The polishing material 912 may be a conventional polishing pad, for example, a sheet of polyurethane and/or polyurethane mixed with fillers, such as those generally commercially, or a polishing web of material comprising a plurality of abrasive elements suspended in a polymer binder tensioned between rollers disposed on either side of the platen 910. Typically, a polishing medium, such as an abrasive slurry, de-ionized water or other liquid or polishing compound is supplied between the polishing material 912 and the substrate supported in the polishing head 920 to facilitate material removal from the substrate. One polishing system having a polishing station that may be adapted to benefit from the invention is described in U.S. Pat. No. 6,244,935, issued Jun. 12, 2001 to Birang et al., which is hereby incorporated herein by reference in its entirety.

Therefore, the present invention substantially prevents gases from reaching the substrate's surface during electrochemical processes. The spacer and membrane, functioning individually or in concert, provide a barrier to gas passage. The basin assembly is configured to enhance radial movement of gases away from the substrate. Moreover, the polishing fluid delivery system is configured to remove entrained gases. As such, electrochemical processing of the substrate is enhanced.

While the foregoing is directed to various embodiments of the invention, other and further embodiments of the invention may be devised without departing from the basic scope thereof, and the scope thereof is determined by the claims that follow.

What is claimed is:

1. A polishing apparatus, comprising:
   a conductive polishing pad;
   an electrode; and
   a spacer disposed between the electrode and the conductive polishing pad, the spacer having a first surface facing the electrode extending from a center of the spacer to an edge of the spacer, wherein a portion of the first surface proximate the edge is closer to the conductive pad than a portion of the first surface proximate the center of the spacer.

2. The apparatus of claim 1, wherein the first surface of the spacer comprises at least a portion of a cone, an ellipsoid, a sphere or a planar surface.

3. The apparatus of claim 1, wherein at least a portion of the first surface of the spacer is orientated at an acute angle relative to a centerline of the conductive polishing pad.

4. The apparatus of claim 1, wherein the spacer is permeable to electrolyte.

5. The apparatus of claim 1, wherein the spacer is comprise a plurality of apertures formed therethrough.

6. The apparatus of claim 1, wherein the spacer is formed of a dielectric material.

7. The apparatus of claim 1, wherein the spacer is formed of a polymer.

8. The apparatus of claim 1, wherein the spacer is formed of a ceramic.

9. The apparatus of claim 1, wherein the first surface of the spacer includes a plurality of ribs extending therefrom.

10. The apparatus of claim 1 further comprising at least one permeable membrane disposed adjacent the first surface.

11. The apparatus of claim 1, wherein the membrane is adhered to the first surface.

12. The apparatus of claim 1 further comprising a tray supporting the electrode, the tray having a port adapted to flow electrolyte to the conductive polishing pad.

13. The apparatus of claim 12, wherein the tray further comprises:
   a basin having sides and a bottom adapted to retain the electrode; and
   a plenum cap disposed on the bottom of the basin and defining a plenum therebetween that is in fluid communication with the port.

14. The apparatus of claim 13, wherein the plenum cap further comprises:
   a cap plate having a plurality of apertures formed therethrough, the apertures in fluid communication with the plenum.

15. The apparatus of claim 13, wherein the plenum cap further comprises:
   a cap plate having a plurality of apertures formed therethrough, the apertures in fluid communication with the plenum and orientated at an acute angle relative to a center axis of the plenum cap.

16. A polishing apparatus, comprising:
   a conductive polishing pad having a substantially planar polishing surface;
   an electrode; and a permeable membrane disposed between the electrode and the conductive polishing pad, the membrane having a non-parallel orientation relative the polishing surface of the conductive pad.

17. The apparatus of claim 16, wherein the membrane has a form comprising at least a portion of a cone, an ellipsoid, a sphere or a planar surface.

18. The apparatus of claim 16, wherein at least a portion of the membrane is orientated at an acute angle relative to a centerline of the conductive polishing pad.

19. A polishing apparatus, comprising:
 a conductive polishing pad having a substantially planar polishing surface;
 an electrode;
 a spacer disposed between the electrode and the conductive polishing pad, the spacer having a first surface facing and substantially parallel to the polishing surface, and a second surface facing the electrode; and
 a permeable membrane disposed adjacent the second side of the spacer, the membrane having a first portion disposed closer to the conductive pad than a second portion.

20. The apparatus of claim 19 further comprising:
 a spacer disposed between the membrane and the conductive polishing pad, the spacer having a first surface facing and substantially parallel to the polishing surface, and a second surface following a contour of the membrane.

21. The apparatus of claim 19 further comprising:
 a basin having sides and a bottom adapted to retain the electrode;
 a port formed through the bottom; and
 a plenum cap disposed on the bottom of the basin and having a plurality of apertures therethrough, the basin and plenum cap defining a plenum therebetween, the port and apertures in fluid communication with the plenum.

22. A polishing apparatus, comprising:
 a conductive polishing pad having a polishing surface substantially perpendicular having a central axis;
 an electrode disposed adjacent the tray bottom; and
 a permeable membrane disposed between the electrode and conductive polishing pad in an orientation non-perpendicular to the central axis.

23. Apparatus for polishing a substrate, comprising:
 a basin having sides and a bottom adapted to contain electrolyte during a polishing process;
 a plenum cap disposed on the bottom of the basin and plenum cap defining a plenum therebetween;
 a plurality of apertures formed through the plenum cap and coupled to the plenum; and
 a port formed through the bottom of the basin and coupled to the plenum.

24. The apparatus of claim 23, wherein the bottom comprises:
 a first recess formed therein that accepts at least a portion of the plenum cap; and
 a second recess formed in the bottom inwards of the first recess, the second recess forming the plenum.

25. Apparatus for polishing a substrate, comprising
 a basin having sides and a bottom adapted to contain electrolyte during a polishing process;
 a plenum cap coupled to the bottom of the basin and having a plurality of apertures formed therethrough, the basin and plenum cap defining a plenum therebetween;

a port formed through the bottom of the basin and coupled to the plenum;
 a plurality of apertures formed through the plenum cap and coupled to the plenum;
 an electrode disposed adjacent the plenum cap;
 a membrane disposed adjacent the electrode, the membrane having a center section disposed closer to the bottom of the basin than an edge of a membrane; and
 a conductive polishing pad disposed adjacent the membrane.

26. A polishing apparatus, comprising
 a tray;
 a conductive polishing pad disposed in the tray;
 an electrode disposed between the conductive polishing pad and a bottom of the tray;
 a membrane disposed between the conductive polishing pad and the electrode, the membrane having an outer edge and a center portion, wherein the outer edge is disposed closer to the conductive pad than the center portion; and
 at least one polishing head adapted to place a substrate retained in the polishing head in contact with the conductive polishing pad.

27. A polishing apparatus, comprising:
 a) a chemical mechanical polishing station comprising:
  at least one platen;
  a polishing material disposed on the platen;
  a polishing fluid delivery system adapted to provide a polishing fluid to the polishing material;
 b) an electrochemical polishing station comprising:
  at least one tray disposed adjacent the platen;
  a conductive polishing pad retained by the tray;
  an electrode disposed between the conductive polishing pad and the tray;
  a membrane disposed between the conductive polishing pad and the electrode, the membrane having an outer edge and a center portion, wherein the outer edge is disposed closer to the conductive pad than the center portion; and
 c) a transfer device comprising:
  at least one polishing head adapted to selectively place a substrate retained in the polishing head in contact with the conductive polishing pad or the polishing material.

28. The apparatus of claim 27 further comprising an electrolyte delivery system coupled to the tray, the electrolyte delivery system comprising a tank having a plurality of baffles disposed therein and at least one pump adapted to flow electrolyte between the tank and the tray.

29. The apparatus of claim 28, wherein the tank further comprises an aperture adapted to allow removal and/or escape of gas from said tank.

30. A method for electrochemical polishing a substrate, the method comprising:
 placing the substrate parallel to a surface of a conductive pad;
 moving the substrate relative to the conductive polishing pad;
 flowing electrolyte between an electrode and the substrate, the electrolyte providing a conductive path between the electrode and the substrate through the conductive polishing pad and through a membrane disposed between the electrode and the conductive pad, the membrane having an edge and a center portion, the edge disposed closer to the conductive pad than the center portion.

31. The method of claim 30, further comprising:
flowing the electrolyte to the electrode through a plurality of apertures formed in a tray supporting the electrode.

32. The method of claim 31, wherein the apertures are coupled to a common plenum formed in the tray.

33. The method of claim 30, wherein gas entrained in the electrolyte is moved radially outward along the surface of the spacer of the membrane.

34. The method of claim 30 further comprising:
removing gas from the electrolyte prior to contacting the electrode.

35. The method of claim 34 wherein the step of removing gas further comprises flowing the electrolyte through a series of baffles disposed in a tank.

36. The method of claim 34, further comprising venting gas the tank.

37. The method of claim 34, further comprising reducing pressure of an atmosphere above the electrolyte in the tank.

38. The method of claim 34 further comprising filtering the electrolyte prior to flowing electrolyte to the electrode.

* * * * *

UNITED STATES PATENT AND TRADEMARK OFFICE
CERTIFICATE OF CORRECTION

PATENT NO. : 6,841,057 B2
APPLICATION NO. : 10/098796
DATED : January 11, 2005
INVENTOR(S) : Ralph Wadensweiler et al.

It is certified that error appears in the above-identified patent and that said Letters Patent is hereby corrected as shown below:

In the Drawings

Replace Drawing Sheet 2 with amended Drawing Sheet 2, copy attached.

Replace Drawing Sheet 6 with amended Drawing Sheet 6, copy attached.

Replace Drawing Sheet 7 with amended Drawing Sheet 7, copy attached.

Replace Drawing Sheet 8 with amended Drawing Sheet 8, copy attached.

Column 5, Line 12: Change "2001" to --2000--

Column 11, Line 27: Change "four" to --five--

Signed and Sealed this

Fourth Day of March, 2008

JON W. DUDAS
*Director of the United States Patent and Trademark Office*